United States Patent
Pittman

(10) Patent No.: US 10,762,528 B1
(45) Date of Patent: *Sep. 1, 2020

(54) PLATFORM FOR LOCATION AND TIME BASED ADVERTISING

(71) Applicant: BoardActive Corporation, Atlanta, GA (US)

(72) Inventor: Douglas L. Pittman, Atlanta, GA (US)

(73) Assignee: BoardActive Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,462

(22) Filed: May 18, 2020

Related U.S. Application Data

(63) Continuation of application No. 16/823,323, filed on Mar. 18, 2020, which is a continuation of application (Continued)

(51) Int. Cl.
*G06Q 30/02* (2012.01)
*H04W 4/02* (2018.01)
(Continued)

(52) U.S. Cl.
CPC ..... *G06Q 30/0261* (2013.01); *G06Q 30/0242* (2013.01); *G06Q 30/0244* (2013.01);
(Continued)

(58) Field of Classification Search
CPC ........... G06Q 30/0261; G06Q 30/0242; G06Q 30/0277; G06Q 30/0267; G06Q 30/0246;
(Continued)

(56) References Cited

U.S. PATENT DOCUMENTS

| 8,271,413 B2 | 9/2012 | Agarawal et al. |
| 8,417,258 B2 | 4/2013 | Barnes, Jr. |

(Continued)

FOREIGN PATENT DOCUMENTS

WO 2016043663 A1 3/2016

OTHER PUBLICATIONS

Copending U.S. Appl. No. 16/877,440, filed May 18, 2020 entitled "Platform for Location and Time Based Advertising".
(Continued)

*Primary Examiner* — Colleen A Hoar
(74) *Attorney, Agent, or Firm* — Bekiares Eliezer LLP

(57) ABSTRACT

Embodiments of the present disclosure may provide methods, systems, and computer-readable media configured to perform at least the following functions: specifying an advertising asset; receiving media content to be associated with the advertising asset; specifying at least one condition for transmitting the media content, wherein specifying the at least one condition comprises specifying at least one of the following: a first condition associated with at least one element of profile data corresponding with a device configured to receive the media content, a second condition associated with at least one action performed by the device, and a third condition associated with a device location; receiving a content captured by the device; detecting the advertising asset with the captured content; determining whether the at least one condition for transmitting the media content has been met; and transmitting the media content.

30 Claims, 26 Drawing Sheets

Related U.S. Application Data

No. 15/950,019, filed on Apr. 10, 2018, now Pat. No. 10,621,620, which is a continuation-in-part of application No. 15/483,790, filed on Apr. 10, 2017, now Pat. No. 10,521,822.

(51) Int. Cl.
   *H04W 4/029* (2018.01)
   *H04W 4/80* (2018.01)
   *H04L 29/08* (2006.01)

(52) U.S. Cl.
   CPC ..... *G06Q 30/0246* (2013.01); *G06Q 30/0264* (2013.01); *G06Q 30/0267* (2013.01); *G06Q 30/0269* (2013.01); *G06Q 30/0277* (2013.01); *H04W 4/02* (2013.01); *H04W 4/023* (2013.01); *H04W 4/029* (2018.02); *H04L 67/306* (2013.01); *H04W 4/80* (2018.02)

(58) Field of Classification Search
   CPC ........... G06Q 30/0244; G06Q 30/0264; G06Q 30/0269; H04W 4/029; H04W 4/023; H04W 4/02; H04W 4/80; H04W 4/024; H04W 4/021; H04L 67/306
   See application file for complete search history.

(56) References Cited

U.S. PATENT DOCUMENTS

| | | |
|---|---|---|
| 8,996,035 B2 | 3/2015 | Busch |
| 9,047,650 B2 | 6/2015 | Strode |
| 9,373,123 B2 | 6/2016 | Carlson et al. |
| 9,674,660 B1 | 6/2017 | Vaynblat et al. |
| 9,918,197 B2 | 3/2018 | Labarca |
| 10,521,822 B2 | 12/2019 | Pittman |
| 10,621,620 B2 | 4/2020 | Pittman |
| 10,621,621 B1 | 4/2020 | Pittman |
| 10,685,380 B1 | 6/2020 | Pittman |
| 10,692,108 B1 | 6/2020 | Pittman |
| 2002/0009978 A1 | 1/2002 | Dukach et al. |
| 2006/0036494 A1 | 2/2006 | Aufricht et al. |
| 2008/0214150 A1 | 9/2008 | Ramer et al. |
| 2009/0149199 A1 | 6/2009 | Maghoul |
| 2009/0197616 A1 | 8/2009 | Lewis et al. |
| 2011/0145068 A1 | 6/2011 | King et al. |
| 2013/0060640 A1 | 3/2013 | Gadhia et al. |
| 2013/0073388 A1 | 3/2013 | Heath |
| 2014/0143060 A1 | 5/2014 | Fernandez |
| 2014/0164125 A1* | 6/2014 | Taylor ................ G06Q 30/0261 705/14.58 |
| 2015/0006278 A1 | 1/2015 | Di Censo et al. |
| 2016/0196582 A1 | 7/2016 | Stone et al. |
| 2016/0232572 A1 | 8/2016 | East et al. |
| 2016/0292713 A1 | 10/2016 | Chen et al. |
| 2017/0161784 A1 | 6/2017 | Malik |
| 2018/0197205 A1 | 7/2018 | Labarca |
| 2018/0293617 A1 | 10/2018 | Pittman |
| 2018/0300761 A1 | 10/2018 | Pittman |
| 2020/0126122 A1 | 4/2020 | Pittman |
| 2020/0219132 A1 | 7/2020 | Pittman |
| 2020/0219133 A1 | 7/2020 | Pittman |

OTHER PUBLICATIONS

Copending U.S. Appl. No. 16/877,448, filed May 18, 2020 entitled "Platform for Location and Time Based Advertising".
Copending U.S. Appl. No. 16/878,834, filed May 20, 2020 entitled "Platform for Location and Time Based Advertising".
Copending U.S. Appl. No. 16/878,869, filed May 20, 2020 entitled "Platform for Location and Time Based Advertising".
International Search Report and Written Opinion dated Jun. 29, 2018 cited in Application No. PCT/US2018/26965, 8 pgs.
U.S. Non-Final Office Action dated Jan. 11, 2019 cited in U.S. Appl. No. 15/483,790, 18 pgs.

\* cited by examiner

Locating your Board

There are several ways to locate your Board within our network.
Please use one the following methods:
-Pin the Board on the map below
-OR Enter an Address below the map
-OR Enter the Latitude and Longitude Coordinates directly

1100

Address

714 Stagecoach Rd, Stockbridge, G

Latitude 33.577598020546164

Longitude

| Dashboard | Admin | Edit My Info | Advertisers | Users | Boards | Tools | Logout |

MY ADVERTISERS

⊕ Add Advertiser

| Name | Board | Users | Delete? |

© 2017 BOARDACTIVE. ALL RIGHTS RESERVED.   FOLLOW AND SHARE

Attractions

Education

Entertainment

Finance

Food

Health and Fitness

Kids

Legal

Lifestyles

Media

PLATFORM FOR LOCATION AND TIME BASED ADVERTISING

RELATED APPLICATIONS

The present application is a Continuation of U.S. application Ser. No. 16/823,323, filed Mar. 18, 2020, entitled "PLATFORM FOR LOCATION AND TIME BASED ADVERTISING", which is a continuation of U.S. application Ser. No. 15/950,019, filed Apr. 10, 2018, entitled "PLATFORM FOR LOCATION AND TIME BASED ADVERTISING", which issued on Apr. 14, 2020 as U.S. Pat. No. 10,621,620, which is a Continuation-In-Part of U.S. application Ser. No. 15/483,790, filed on Apr. 10, 2017, entitled "A PLATFORM FOR LOCATION AND TIME BASED ADVERTISING", which issued on Dec. 31, 2019 as U.S. Pat. No. 10,521,822, assigned to the assignee of the present application, which are hereby incorporated in its entirety by reference. It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to the field of advertising. More specifically, the present disclosure relates to an online platform for managing geolocation and time-based advertising and methods for managing and/or delivering location and time based advertisements.

BACKGROUND

Outdoor advertising is a very common and powerful mode of disseminating information to users. Typically, outdoor advertising involves use of signage (e.g., a billboard, T.V., or other viewable advertisement) installed at public places such as, for example, roadways, bus/train stations, airports, shopping centers, parking spaces, etc. Further, these signage are usually managed by an advertising agency that rents the signage to different advertisers for a predetermined time period. New media now allows online placements in a similar way to billboard advertising.

However, while signage have proven to be an attractive means of advertising, they suffer from several drawbacks. For example, adverse weather such as fog, rain etc. greatly affects visibility of a signage to nearby users. Further, in order to provide visibility in low light conditions, such as during night, external lighting systems are needed which increases cost. Additionally, presence of extraneous objects such as trees, buildings, etc. partially or completely occludes signage resulting in poor visibility to users. Furthermore, for signage situated at locations, such as along highways, where users are always moving, sufficient exposure of advertisements to users may not be possible. It is therefore more difficult for the users to memorize the information of the advertisements.

Further, with existing methods of advertising using signage, neither the advertising agency, media buyer, reseller, nor the advertiser is able to determine reach and/or effectiveness of the advertisements. In other words, the advertiser is currently unaware about analytical information relating to consumption and usage of the advertisements on signage. Accordingly, advertisers are disadvantaged with regard to improving effectiveness of advertisements on signage or other advertising mediums such as, for example, but not limited to TV, real estate and other static, traditional, virtual, 3D, holographic, and other digital signage platforms. Digital signage may also be known as 'dynamic signage', and 'digital streaming'. If you work in marketing, design, IT, or PR, you've likely come across a digital signage scenario that asks for your expertise. Digital signage is used across a wide portfolio. You see it in schools, convenience stores, hospitals, universities, receptions, sporting events, bus stops, malls and more. It's used to inform, educate, entertain and sell.

Over the years, the digital signage industry has adapted. What was once expensive, difficult and only available to the big brands of the world is now accessible by everyone. For the independent restaurateurs and the corner shops, as much as the big brands and signage. Digital signage includes the provision of content (video, images, adverts, presentations) to a digital device such as a TV screen, tablet, iPad or kiosk. Digital signage may be used in both public and private areas, including, for example, schools, stores and waiting rooms, to restaurants, bus stops and airports. Digital signage can also sometimes be called 'digital OOH', 'digital out-of-home' or 'dynamic signage' but all effectively refer to the same thing.

Advertising on digital signage is currently non-interactive. In other words, subsequent to a user viewing an advertisement on a digital signage, there may be no immediate action performable by the user as a result of viewing the advertisement. Typically, the user needs to remember or note writing information from the advertisement and perform a related action later by, for example, going online, calling a phone number, making a purchase, etc. Accordingly, the user is burdened with remembering or writing down information or taking a picture. As a result, a large number of users choose to ignore the advertisement, thus reducing the reach and/or effectiveness of the advertisement.

Therefore, there is a need for improved methods and systems for advertising in outdoor and indoor locations.

BRIEF OVERVIEW

A platform for location and time-based advertisements and methods for managing and/or delivering location and time-based advertisements may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure may provide methods, systems, and computer-readable media configured to perform at least the following functions:

registering asset data, wherein registering the asset data comprises at least one of the following:
  registering an image, and
  registering at least one geolocation associated with the image;
receiving media content to be associated the registered asset data, wherein the media content is configured to be operative with at least one of the following: a content interaction layer and a device tracking layer,
  wherein the content interaction layer is configured to enable:
    an interaction with a consumer of the media content in conjunction with, at least in part, the media content, and
  wherein the device tracking layer is configured to enable:
    a tracking of at least one action performed by the consumer of the media content in conjunction with, at least in part, the media content;
specifying at least one rule for transmitting the media content, wherein specifying the at least one rule comprises specifying at least one of the following:

a first rule associated with at least one element of profile data corresponding with the consumer, a second rule associated with at least one action performed by the consumer, and a third rule associated with a consumer location;

receiving captured content from a device associated with the consumer;

processing the captured content to detect the image within the captured content;

determining if the at least one rule is met; and transmitting the media content when the at least one rule is met.

Embodiments of the present disclosure may provide methods, systems, and computer-readable media configured to perform at least the following functions:

specifying a brand asset, wherein specifying the brand asset comprises specifying at least one of the following:
  a trade name,
  a trade dress,
  a logo, and
  a source-identifier associated with a brand;

specifying interactive content to be associated with the brand asset,
  wherein the interactive content is configured to be operative with a content interaction layer on a device configured to receive the interactive content,
    wherein the content interaction layer is configured to enable an interaction between a user of the device and the interactive content;

specifying at least one condition for transmitting the interactive content, wherein specifying the at least one condition comprises specifying at least one action performed by the device;

receiving a captured content from the device;

detecting the brand asset with the captured content;

determining whether the at least one condition for transmitting the interactive content has been met; and transmitting the interactive content.

Embodiments of the present disclosure may provide methods, systems, and computer-readable media configured to perform at least the following functions:

specifying an advertising asset;

receiving media content to be associated with the advertising asset;

specifying at least one condition for transmitting the media content, wherein specifying the at least one condition comprises specifying at least one of the following:
  a first condition associated with at least one element of profile data corresponding with a device configured to receive the media content,
  a second condition associated with at least one action performed by the device, and
  a third condition associated with a device location;

receiving a content captured by the device;

detecting the advertising asset with the captured content;

determining whether the at least one condition for transmitting the media content has been met; and transmitting the media content.

Embodiments of the present disclosure may provide methods, systems, and computer-readable media configured to perform at least the following functions:

specifying a content distribution campaign, the content distribution campaign comprising;
  a geolocation, and
  media content associated with the geolocation;

specifying a plurality of rules for the content distribution campaign, wherein specifying the plurality of rules comprises:
  specifying a first rule corresponding to a period of time,
  specifying a second rule corresponding to at least one element of profile data associated with a consumer, and
  specifying a third rule corresponding to a course of travel associated with the consumer;

receiving a first indication that the consumer is at a first location within a radius of the geolocation;

assessing, in response to the first indication, the at least one element of profile data associated with the consumer;

receiving a second indication that the consumer is at a second location;

determining the course of travel based, at least in part, on an analysis of the first location and the second location; and establishing that the consumer is eligible for the content distribution campaign when the plurality of rules is satisfied.

Embodiments of the present disclosure may provide methods, systems, and computer-readable media configured to perform at least the following functions:

specifying a content distribution campaign comprising media content associated with a geolocation;

specifying a plurality of rules for the content distribution campaign, wherein specifying the plurality of rules comprises:
  specifying the geolocation,
  specifying a period of time, and
  specifying at least one action to be performed by a consumer;

receiving a first indication that the consumer is within a radius of the geolocation;

tracking the consumer in response to receiving the first indication to determine whether the consumer has performed the at least one action; and establishing that the consumer is eligible for the content distribution campaign when the plurality of rules is satisfied.

Embodiments of the present disclosure may provide methods, systems, and computer-readable media configured to perform at least the following functions:

defining at least one of the following for a registered asset:
  a physical asset, and
  a virtual asset;

defining a media content associated with the registered asset, the media content comprising a first message and a second message;

defining a consumer audience segment to be delivered the media content;

defining a set of rules for providing the media content to the consumer audience segment, the set of rules comprising:
  a first rule corresponding a consumer's location in association with the registered asset, and
  a second rule corresponding to at least one action performed by a consumer during a course of travel related to the consumer's location in association with the registered asset;

receiving a first determination that the first rule has been satisfied;

associating the first message with the consumer upon the first rule being satisfied;

receiving a second determination that the second rule has been satisfied; and associating the second message with the consumer upon the second rule being satisfied.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 11 illustrates a screenshot 1100 of a GUI for receiving a first geolocation corresponding to traditional or digital signage, in accordance with some embodiments.

FIG. 13 illustrates a screenshot 1300 of a GUI for adding one or more advertisers on the online platform, in accordance with some embodiments.

DETAILED DESCRIPTION

Figure 1:
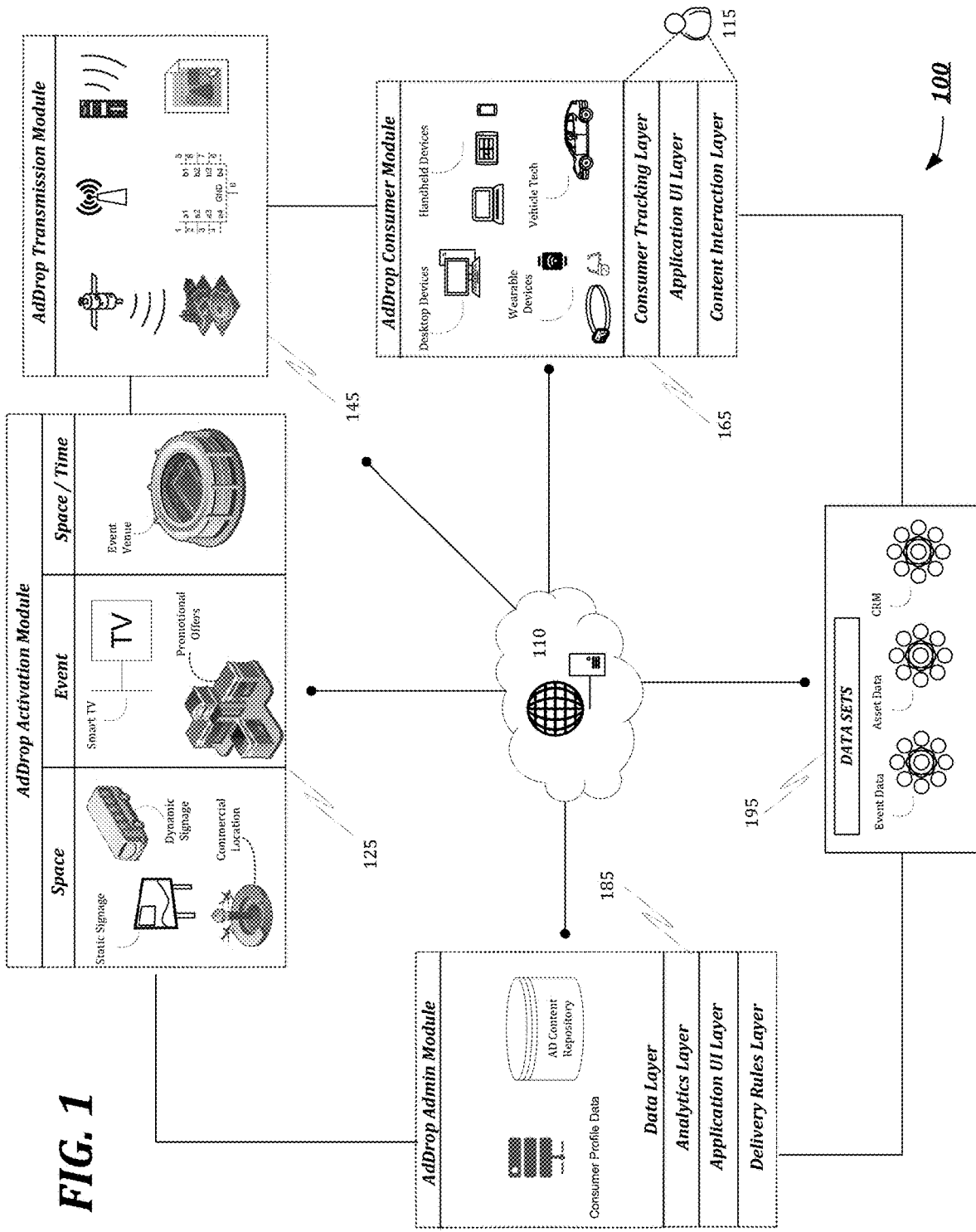
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one", but does not exclude a plurality unless the contextual use dictates otherwise. When used herein to join a list of items, "or" denotes "at least one of the items", but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, updates, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of outdoor advertising, embodiments of the present disclosure are not limited to use only in this context. For example, the geolocation and time based advertising are configurable to be used for indoor advertising as well.

Further still, the term 'signage' is used throughout the present specification as a general reference to an advertising medium. Although a signage may be described in various embodiments, it should be understood that any advertising medium may be similarly applicable and considered to be within the scope of the present disclosure. Other advertising media may include, by way of non-limiting example, billboards, TV, real estate and other static, traditional, virtual, 3D, holographic. and digital signage platforms.

Still consistent with embodiments of the present disclosure, advertising content may be provided based on at least one of, or both, geolocation and time data. Although some embodiments of the present disclosure are described with respect to geolocation based advertising, such embodiments may be contemplated to apply to time-based advertising and are, therefore, considered to be within the scope of the present disclosure.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

The present disclosure may provide a stand-alone application, API, or SDK, configured to, for example, but not be limited to: i) register digital assets, physical assets, virtual assets, brand assets, media assets, and mobile assets associated with a platform user; ii) associate content to be delivered in response to an activation of those assets, including interactivity criteria, if applicable; iii) specify triggers for delivering the content and target consumer profiles for receiving the content; and iv) transmit content for engaging the consumer at the right time and/or place, with the targeted profile, and v) track user engagement and provide analytics on consumer engagement.

Disclosed is a method of geolocation and time-based advertising. The method may include generating, using a processor, a Graphical User Interface (GUI) or a Visual User Interface (VUI), which may be used interchangeably herein, configured to be displayed on a client device. A client device may include a plurality of different computing devices. Additionally, the method may include transmitting, using a communication interface, the GUI to the client device. The transmission may be performed via a modem configured to the device. Further, the method may include receiving, using the communication interface, a first geolocation from the client device based on a user interaction with the GUI. Furthermore, the method may include, receiving, using the communication interface, an advertisement content from the client device. Additionally, the method may include creating, using the processor, an association between the first geolocation and the advertisement content. Further, the method may include storing, using a storage device, each of the first geolocation, the advertisement content and the association. Furthermore, the method may include receiving, using the communication interface, a second geolocation from a mobile device. Additionally, the method may include comparing, using the processor, the second geolocation with the first geolocation. Further, the method may include transmitting, using the communication interface, the advertisement content to the mobile device based on the comparing.

Also disclosed is an online platform for geolocation and time-based advertising. The online platform may include a communication interface configured to: transmit a GUI to a client device; receive a first geolocation from the client device based on a user interaction with the GUI; receive an advertisement content from the client device; receive a second geolocation from a mobile device; and transmit the advertisement content to the mobile device based on a comparison between the first geolocation and the second geolocation. Additionally, the online platform may include a processor configured to: generate the GUI configured to be displayed on the client device; create an association between the first geolocation and the advertisement content; compare the second geolocation with the first geolocation. Further, the online platform may include a storage device configured to store each of the first geolocation, the advertisement content and the association.

Embodiments of the present disclosure may provide a platform 100 for enabling the delivery of content based on certain content selection and delivery rules (hereinafter, referred to as an AdDrop™). Although the term "AdDrop™ is a mark registered to the present Applicant, BoardActive Corporation, the scope of the present disclosure is intended to cover any delivery of content based on certain content selection and delivery rules.

The platform may enable a platform user (e.g., an Administrator or "Admin") to interact with its target content consumers based on, for example, but not limited to, the location of the consumer in time and space, the actions the consumer takes within the time and space, the characteristics of the consumer, and the characteristics of their technical devices. Accordingly, the various embodiments disclosed herein provide a new medium of communication with consumers. The medium established by the present disclosure may be presented to the user on a digital content provision medium while still taking into account, for example, but not limited to:

1) the physical space and time associated with the consumer;
   a. where is the consumer and when is the consumer there?
2) the consumer's actions within the physical space and time;
   a. what is the consumer doing at that time and place?
3) the consumer's characteristics and profile data; and
   a. what do we know about this consumer?
4) the consumer's hardware for interfacing with the medium.
   a. what screen is the consumer interfacing through?

Having addressed these points, the platform of the present disclosure may then determine, as will be detailed below, what content to deliver, how to deliver the content, when to deliver it, where to deliver, and who to deliver the content to. In this way, instead of providing generic content (e.g., advertisements) in space (e.g., a billboard or sign) or in time (e.g., a commercial), embodiments of the present invention enable an Administrator to bring a custom-tailored content directly to the nearest and best device associated with their target consumer within various locations in time and space.

Still consistent with embodiments of the present disclosure, a content of the AdDrop™ may be configured for functional interactivity with consumer. The interaction may range from a basic request from a manual user input to a tracking of user behavior with reference to the AdDrop™. In one example, an Admin of the platform (e.g., an Advertiser) may "drop" an advertisement to a consumer's device. The advertisement, in this example, may be a promotional offer that requires a user interaction to be 'revealed' or otherwise made available to the consumer. The advertisement may instruct the user to perform an action, and the platform may be enabled track the user's performance of the action. Upon a determination that the required action has been performed, a promotion associated with the AdDrop™ may be revealed, communicated, activated, or otherwise made available for consumption.

For example, a fast-food restaurant may configure the platform of the present disclosure to affect an AdDrop™ when a consumer is within a proximity to a billboard advertising the fast-food restaurant. A space-based AdDrop™ is disclosed in more detail below. The content of the AdDrop™ may appear on any computing device in operative communication with the platform (e.g., a mobile device associated with the user). The content may instruct the consumer to take a specific action in order to obtain a promotional offer. In one example, the action may require the consumer to navigate to a location (e.g., the fast-food restaurant) within, for example, a pre-determined period of time or a specific route. The consumer may elect to engage in the promotion and begin navigating to the particular location. The platform may track the consumer's behavior against the interactivity criteria for revealing the promotional content. Upon detection of the fulfillment of the interactivity criteria (e.g., the consumer has arrived at the location within the predetermined period of time/via the specified route), the promotional content may be provided to the user.

As another example, a radio station may issue an AdDrop™ at a point in time to a device associated with an end consumer (e.g., their car-entertainment system). A time-based AdDrop™ is disclosed in more detail below. The AdDrop™ may require the consumer to be one of the first few people to input an answer to a question to win the promotion. Consistent with embodiments of the present disclosure, modules may enable the consumer to interact with the AdDrop™ through a user interface (UI) layer integrated to the device receiving the AdDrop™.

As yet another example, an event coordinator (e.g., a facilitator of a sporting event) may issue an AdDrop™ at a point in time and space to consumers within the space at the time. A space and time based AdDrop™ is disclosed in more detail below. The faciliatory of the sporting event may send content to the attendees of the event. The content may require an interaction to provide the consumer with a reward for performing the interaction. For example, the consumer may be required to share the content on their social media. In another example, the consumer may be required to shake their phone quickly, so as to ascertain phone telemetry data. The telemetry data may then be analyzed to determine if the user would qualify for the promotion (thereby engaging in interactivity with the audience members of the venue).

In some embodiments of the present disclosure, the platform may provide an AppAddress™ for an Admin to track and organize their media assets used in triggering an AdDrop™. Although the term AppAddress™ is a mark associated with to the present Applicant, BoardActive Corporation, the scope of the present disclosure is intended to cover any tracking, organization, and identifier means for media assets. As will be detailed below, the media assets may be comprised of, but not limited to, for example, a digitization of physical assets (e.g., geolocations for Billboards and Signage—referred to herein as "Smart Billboards" or "Active Boards") and a digitization of virtual assets (e.g., areas of space; events in space-time). Further examples of digitized assets may include, but not be limited to, for example, commercial centers, entertainment venues, transportation centers, television networks, online media networks, physical events, and virtual events.

The platform may enable the Admin to establish an exclusive permission for issuing an AdDrop™ within the AppAddress™ (e.g., geo-fencing or time-based fencing). The AppAddress™ may be comprised of a unique identifier which, in turn, may be transferable from one owner to another. In this way, the exclusive permission for issuing an AdDrop™ within an AppAddress™ may be transferred from one Admin to the next as a transferrable asset, much like a web domain.

In yet further embodiments, an AppAddress™ may be associated with a digitization of various brand assets (e.g., Tradename's, Logo's, Products, Designs, and other brand-identifying parameters for the Admin). Image processing techniques may be used to aid in the identification of those brand assets. In this way, and as will be detailed below, a consumer may submit a captured image in order to receive an AdDrop™. The platform may process the image to determine if any of the objects within the image correspond to brand asset associated with an AppAddress™. If so, the platform may then employ the methods and systems disclosed herein to deliver the appropriate content to the end user. Accordingly, an AppAddress™ may be associated with media assets and brand assets.

Embodiments of the present invention may be further enabled to associate mobile assets with an AppAddress™. For example, an Admin could configure their mobile assets to be used as 'moving billboards' for issuing an AdDrop™ to a target consumer. The platform may be enabled to track the location of the mobile assets in a plurality of ways. In a first instance, the platform may track the mobile asset locations (e.g., a fleet of trucks) through an asset tracking module associated with the platform. Such asset tracking module may comprise a computing device (e.g., smartphone) or dedicated global positioning system hardware. In this way, the platform may ensure that platform consumers within a radius of the mobile asset may be issued an AdDrop™. In another instance, the platform may track the mobile asset locations (e.g., city buses) through an external database with up-to-date mobile asset location information.

As another, non-limiting example, a food-truck company might register their trucks as mobile assets to their AppAddress™. They can further associate promotional content to be issued through an AdDrop™ to prospective customers within the proximity of those mobile assets. In this way, the prospective customers may be notified with the AdDrop™ of the food-truck's proximity. As will be further detailed below, the AdDrop™ may track the prospective customer's actions for rewards (promotions) and other interactivity upon the prospective customer's fulfillment of an action (e.g., arriving at the mobile asset's location within a period of time, or sharing the content of the AdDrop™ through social media).

Still consistent with embodiments of the present disclosure, the appropriate content to be used for an AdDrop™ may be defined by the Admin and, in some embodiments, may be further associated at the AppAddress™. The content may be provided by the Admin in various content types (e.g., iOS compatible, Android compatible, and the like). Furthermore, and as will be detailed below, the content may be segmented into various categorizes, tailored for a profile characteristic of the consumer that is to receive the content. Further still, the content may be segmented to correspond to specific digitized assets used in triggering the delivery of the content. For interactive content, the Admin may be enabled to configure interactivity criteria that a consumer must engage in for the delivery or disclosure of certain content segments. This interactivity criteria for the delivery or disclosure of content segments may be employed by the platform in the determination of which content segments to deliver, in response to which user actions.

In accordance to the various embodiments herein, each AdDrop™, AppAddress™, digitized assets, and/or delivered content may be associated with analytics. The platform may be comprised of an analytics layer that compiles and tracks, through a tracking module, a consumer's behavior or engagement with the AdDrop™. As will be detailed below, the analytics module may provide metrics associated with the AdDrop's impressions, click-throughs, revisits, and various other tracking metrics. In some embodiments, the analytics layer may be in operative communication with the tracking module and consumer profile data in order to compile and aggregate such metrics. In this way, by way of non-limiting example, the analytics layer can track a consumer's interaction with the AdDrop™ as well as actions made subsequent to the consumer's engagement with the AdDrop™ (e.g., a "conversion" metric might be set to track when the consumer routes to a Fast Food restaurant after receiving an AdDrop™). The tracking of user behavior with regard to content present to the consumer in time and space may be referred to as Geolitics™.

In various embodiments, the analytics layer may be in bi-directional communication with an external dataset. The external dataset may be, for example, CRM data comprising additional user profile data. In this way, the platform may obtain profile data for a consumer as well as return additional analytics data back to the external dataset. Thus, the external dataset may be used for i) determining the content of an AdDrop™ for a specific consumer, and ii) maintaining an up-to-date profile for a consumer, including analytics obtained after the delivery of the AdDrop™, thereby providing a more complete user profile. Additional details with regard to the analytics layer are provided below.™

Consistent with embodiments of the present disclosure, the platform may be configured to work as a stand-alone application (as detailed in '790 application), or as an application programming interface (API) and/or software development kit (SDK) for developers of existing applications. In this way, the platform, and the various modules disclosed herein, may be utilized modularly and integrated into various parties to establish, for example, a content delivery network.

For example, a brand (e.g., a fast-food restaurant chain) may have an existing mobile application for its consumers nationwide. The same brand may also have, for example, billboards and various other media assets throughout the nation that it uses in advertising to its consumers. The platform of the present disclosure may provide a solution for such brand to digitize their media assets and deliver interactive content to their consumers by integrating their mobile application with the platform of the present disclosure. In this way, the integrated application may now enable the brand to engage its consumers when they are, for example, at designated points in space (e.g., near a billboard or at a store), and time (e.g., during a video commercial for the brand) for an AdDrop™. Moreover, the interactivity of the AdDrop™ will enable yet a deeper level of consumer engagement with the brand, with the added benefit of aggregating richer analytics on their consumers and their interaction history with the brand.

Accordingly, embodiments of the present disclosure may provide a stand-alone application, API, or SDK, configured to, for example, but not be limited to:
  i) register digital assets, physical assets, virtual assets, brand assets, media assets, and mobile assets associated a platform Admin (e.g., an AppAddress™),
  ii) associate content to be delivered in response to an activation of those assets (e.g., an AdDrop™), including interactivity criteria, if applicable, iii) specify triggers for delivering the AdDrop™ (e.g., space/time/event) and target consumer profiles for receiving the AdDrop™ (e.g., Gender/Demographic/Propensity/Interest/Behavior/Etc.),
  iv) transmit interactive AdDrop™ for engaging the consumer at the right time/place, with the targeted profile, and
  v) track user engagement and provide analytics on consumer engagement.

Still consistent with embodiments of the present disclosure, an online platform for geolocation and time based advertising may be provided. The online platform may be used by individuals or companies to provide geolocation and time based advertisements associated with real and/or virtual signage to mobile users and also track user interaction with the geolocation and time based advertisements.

The online platform for geolocation and time based advertisements enables an advertising company and others to manage all traditional or digital signage from a single user interface. A virtual signage works much like a traditional or digital signage in that a user can see an advertisement when the user is physically located near a geolocation associated with the virtual signage. Accordingly, the online platform may broadcast the advertisement to the user when the user is a vicinity of the traditional or digital signage.

As an example, users who drive by a geolocation may be "beaconed" or provided with promotional content through, for example, a mobile device application. In an instance, a beacon (i.e., a radio transmitter) may be installed at a traditional or digital signage and/or a location corresponding to a virtual signage. In other embodiments, a modem may be installed and configured to the signage to enable telecommunications between devices and the signage. The content may include, in some instances, a live feed transmission. Further still, the content may include contact point information of a person or entity associated with the content. In some instances, signage with beacon technology may be considered as "Smart Billboards" or "Active Boards" with geolocation and time based interactive functionality. As will be described in greater detail below, other advertising platforms, such as TVs, may be "Smart TVs" with geolocation and time based interactivity functions.

Beacons are small devices which can transmit a signal therefore 'searching' for a Bluetooth-enabled device like a smartphone. They are low-cost and require little energy, with transmitters that are equipped with Bluetooth Low Energy (BLE). They're becoming a hot topic within digital signage as the Beacon transmitters can determine how close a device is (such as a smartphone in a shopper's pocket) and transmit a specific signal as a result. This signal may trigger an app on the device, therefore drawing attention to the physical business or location that the beacon is housed in. It should be understood that content may be transmitted from a signage to any type of computing device capable of providing the content to its corresponding user. Thus, although some embodiments disclose mobile computing devices, such as smartphones, many other computing devices may apply, including, but not limited to, in-car entertainment systems.

Accordingly, as a user drives by the traditional or digital signage and/or the location associated with the virtual signage, a mobile device of the user gets beaconed with promotional content. Alternatively, the mobile device of the user may determine a geolocation of the mobile device and transmit the geolocation to the online platform. Subsequently, the online platform may transmit the promotional content to the mobile device.

The promotional content may include a website, a phone, an email address, a video, live feeds, an expiration date, a QR code and a URL for tracking users and interacting with users, as well as additional information about the advertiser. In addition, the content may include connect point information. The connect point information may include, for example, an owner of the signage or a representative of the owner. The URL may include a unique identifier associated with traditional or digital signage.

Accordingly, when the user clicks the URL, the online platform may cross reference the user. In other words, the online platform may detect consumption of the advertisement by the user and consequently generate advertisement statistics corresponding to large number of users. Further, the online platform may also transmit a cookie to the mobile device to track the user for marketing purposes and online behavioral advertising. As a result, the advertisement statistics and/or analytics may indicate number of users who drove by a signage; number of users who clicked the URL that was sent to their mobile device when they drove by the signage; number of users who shared the advertisement and so on. Further, webpage corresponding to the URL may include tracking data that enables the advertising company to collect demographic information of the users who viewed the signage.

Further, the online platform may also allow advertising companies to purchase or rent a physical signage and/or a virtual signage. Accordingly, the online platform may provide a user interface for making payments. Further, the online platform may allow the advertising companies to manage payment schedules, including for example, automatic renewal of rent or lease.

Furthermore, the online platform may integrate with existing advertisement networks (e.g., Google™ Ad Network), mapping applications (e.g., Google Maps™), in-vehicle communication systems (e.g., Apple™ Carplay™) and navigation systems (e.g., TomTom™) in order to deliver advertisements while users drive by real and/or virtual signage.

Additionally, the online platform may facilitate a pin drop feature, according to which, when a user is driving by a location, the user may perform a pin drop action. Consequently, all advertisements from traditional or digital signage in the vicinity of the location may be automatically received and saved in the mobile device of the user. Accordingly, the user may view the advertisements, or reload the advertisement, later on. Such commands may be performed using voice command technology associated with the mobile device, enabled with a plurality of voice commands.

Figure 9:
FIG. 9 illustrates a screenshot 900 of a GUI for adding one or more traditional or digital signage to an online platform for geolocation and time based advertisements, in accordance with some embodiments.
Figure 10:
FIG. 10 illustrates a screenshot 1000 of a GUI for receiving information regarding traditional or digital signage to be added on the online platform, in accordance with some embodiments.
Figure 12:
FIG. 12 illustrates a screenshot 1200 of a GUI for receiving advertisement content corresponding to traditional or digital signage, in accordance with some embodiments.

The online platform provides a GUI to enable an advertising company to add traditional or digital signage, exemplarily illustrated in FIG. 9. Further, the GUI, as exemplarily illustrated in FIG. 10, may enable the advertising company to provide information associated with the advertising company, such as, for example, a name of the advertising company, a category of an advertisement content, a name of the traditional or digital signage, notes and a description etc. Additionally, the GUI may enable the advertising company to define an advertising content associated with the traditional or digital signage. Further, the GUI, as exemplarily illustrated in FIG. 11, may allow the advertising company to define a geographic location of the traditional or digital signage. In some embodiments, geofencing may be enabled by the area or set of coordinates selected by the user. In some instances, the geographic location does not need to correspond to a physical board and can be a purely digital signage (i.e., virtual signage). Further, the GUI, as illustrated in FIG. 12, may also enable selection of a signage image that gets sent to mobile devices of users when they pass by the traditional or digital signage and/or a location of the virtual signage. Additionally, the GUI may also enable the advertising company to define a radius. Accordingly, only those users whose distance from the geographical location is lesser than or equal to the radius would receive the advertising content.

Figure 14:
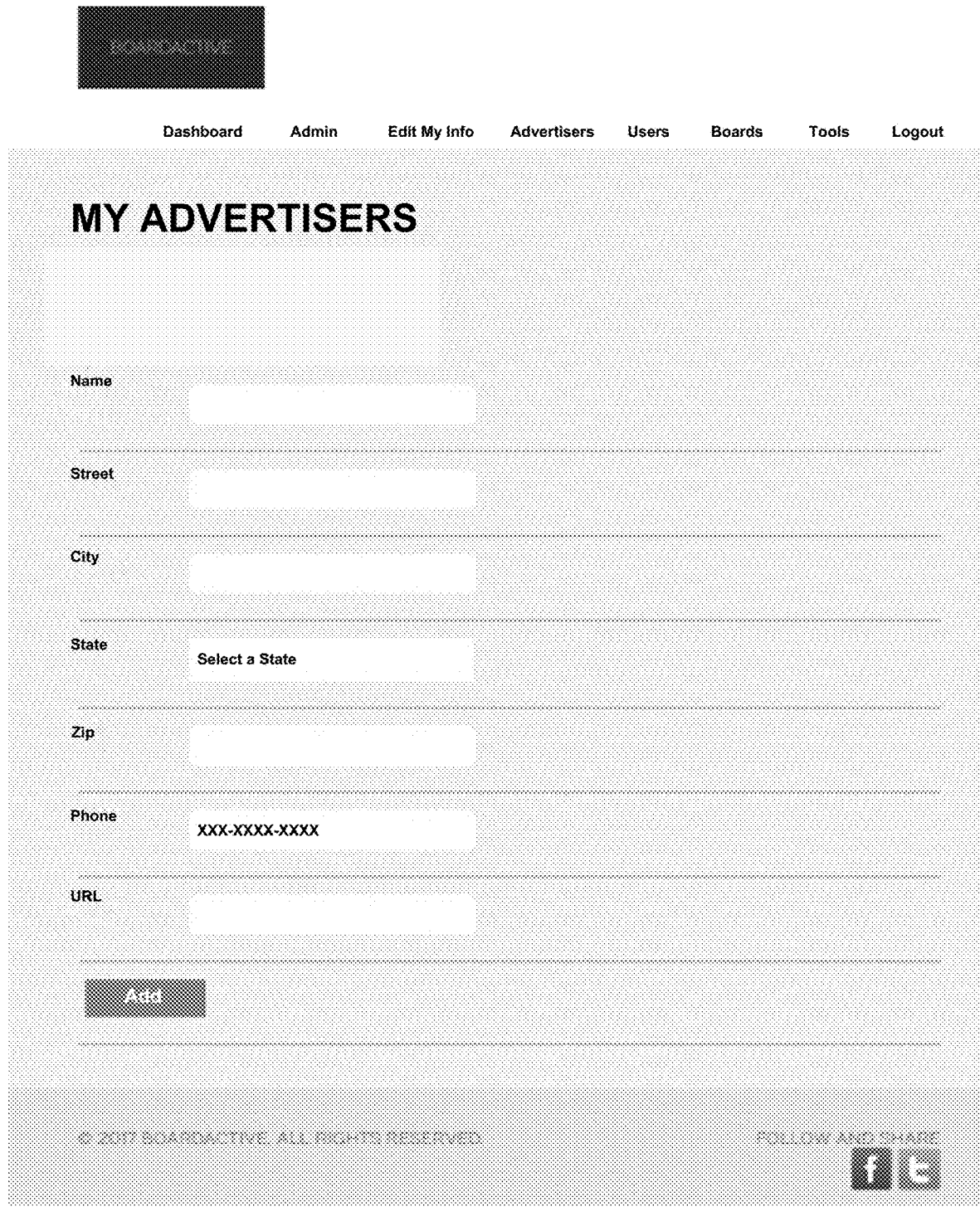
FIG. 14 illustrates a screenshot 1400 of a GUI for receiving information corresponding to an advertiser to be added on the online platform, in accordance with some embodiments.

Further, the online platform may allow a platform manager to add, delete or modify user accounts corresponding to advertising companies through the GUI, as exemplarily illustrated in FIG. 13. Accordingly, the GUI, as exemplarily illustrated in FIG. 14 may enable the platform manager to enter details corresponding to an advertising company to be added to the online platform. Consequently, an advertising company may become a user of the online platform for managing and/or delivering associated geolocation and time based advertisements.

Further, in order to facilitate delivery of advertisement content to users, the online platform may provide a software application ("app") installable on the mobile device associated with a user. The mobile devices may include, for example, smartphones, in-vehicle communication systems, navigation systems, and digital signage, and other formats. For instance, the app may be made available for download at an app store or online.

Figure 16:
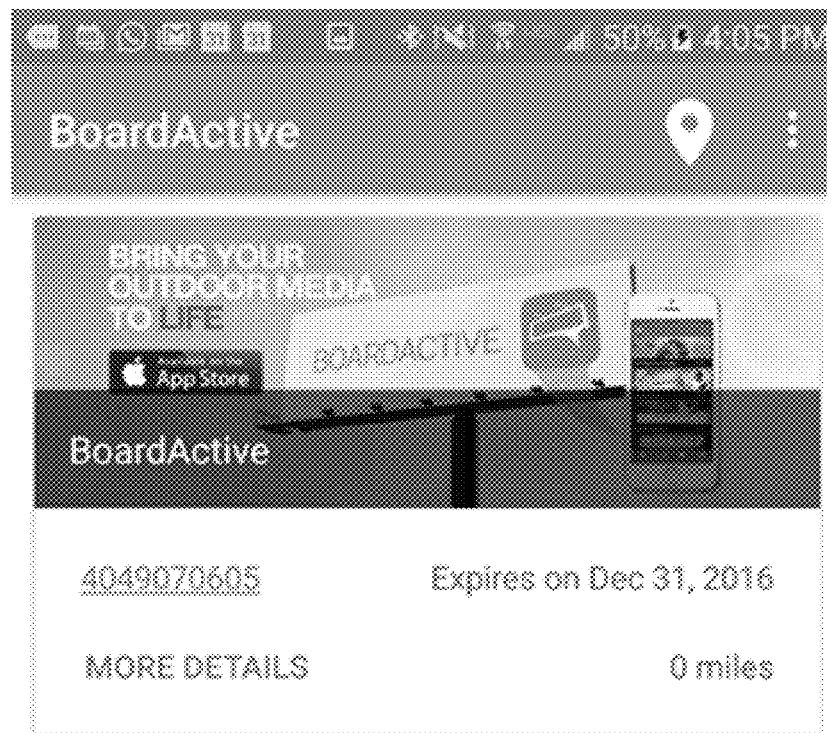
FIG. 16 illustrates a screenshot 1600 of a mobile app for delivering geolocation and time based advertisements, depicting advertisement content corresponding to one or more traditional or digital signage saved by a user, in accordance with some embodiments.
Figure 16:
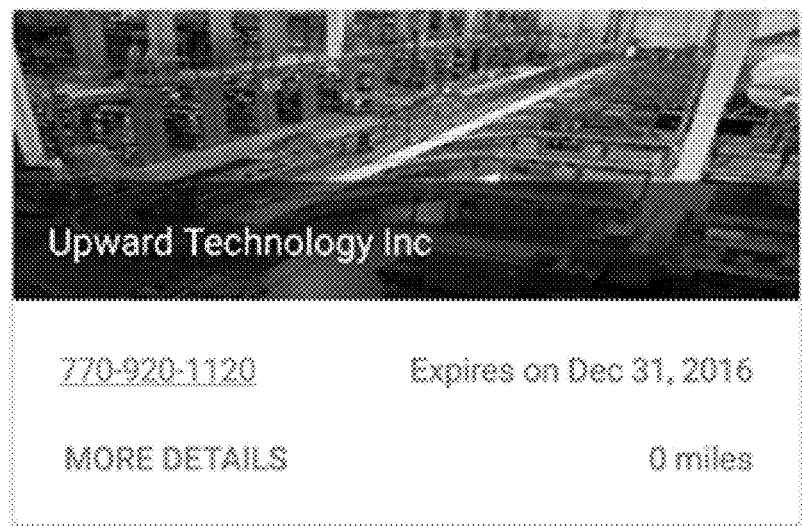
Figure 16:
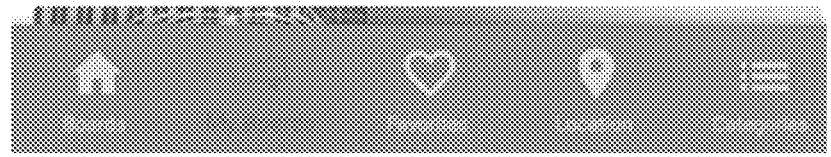
Figure 17:
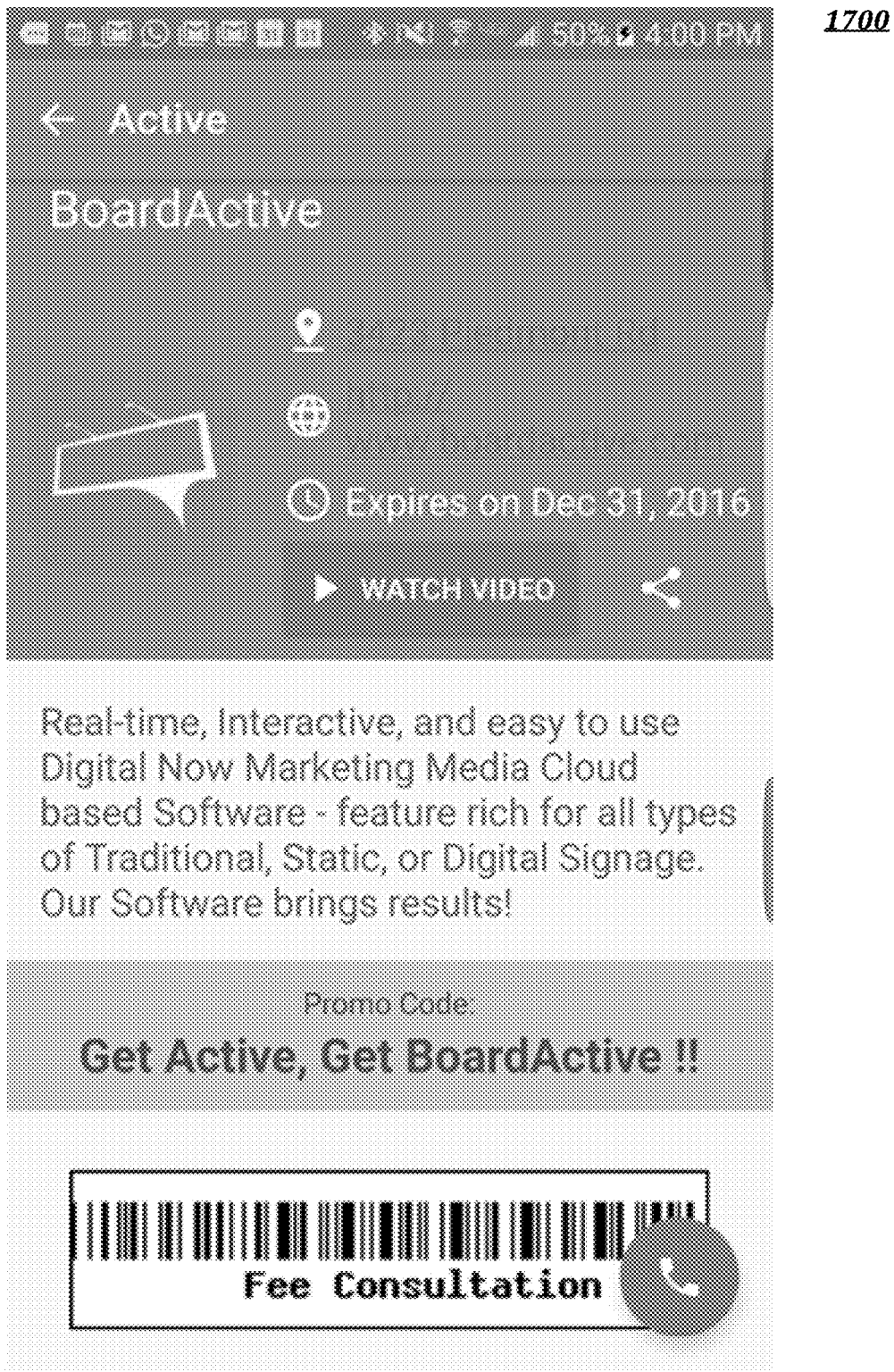
FIG. 17 illustrates a screenshot 1700 of a mobile app for delivering geolocation and time based advertisements, depicting advertisement content corresponding to traditional or digital signage, in accordance with some embodiments.

The app may be configured to monitor geolocation of the mobile device, using for example, a built-in GPS receiver in the mobile device. Further, the app may be configured to transmit the geolocation to the online platform through a wireless communication network, such as, cellular network. Accordingly, the online platform may be configured to identify and retrieve advertisement content associated with real and/or virtual signage corresponding to the geolocation transmitted by the mobile device. Subsequently, the online platform may transmit the advertisement content to the mobile device to be displayed on the mobile device, as exemplarily illustrated in FIG. 17. Further, the app or beacon may be configured to store all such advertisement content received from the online platform in a local storage unit on the mobile device. Accordingly, the app may enable a user to view all traditional or digital signage that the user has passed by (e.g., walk, ride, or drive), as exemplarily illustrated in FIG. 16.

Figure 15:
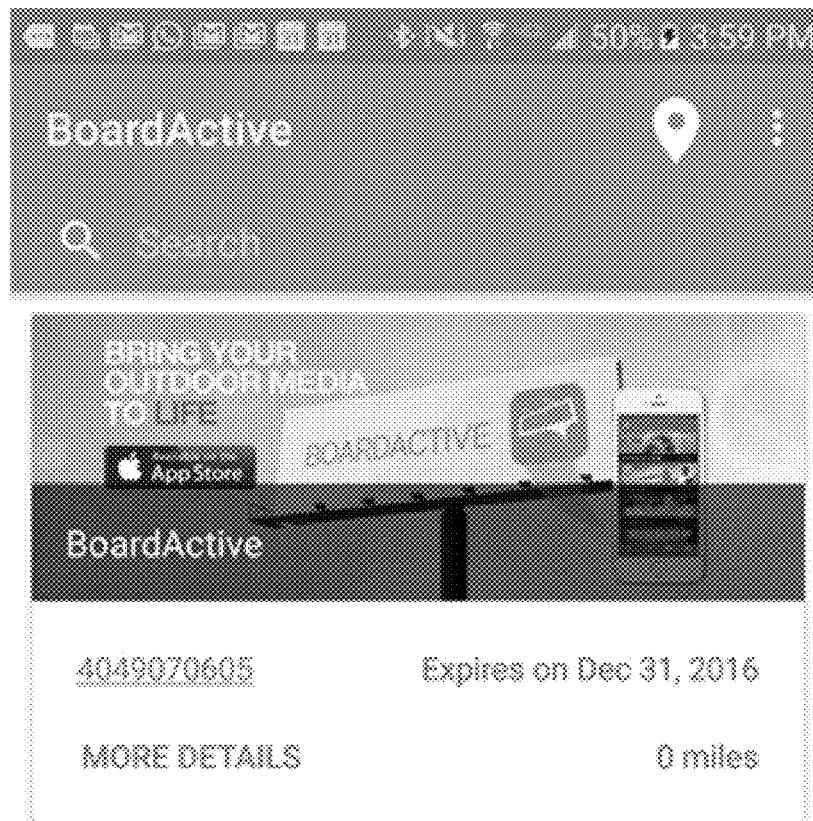
FIG. 15 illustrates a screenshot 1500 of a mobile app for delivering geolocation and time based advertisements, depicting advertisement content corresponding to one or more traditional or digital signage passed by a user, in accordance with some embodiments.
Figure 15:
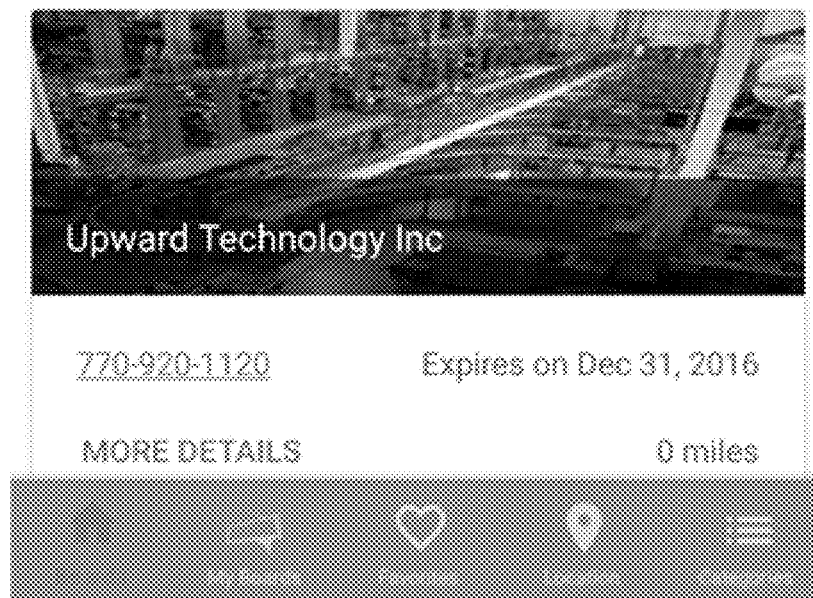

Additionally, when an advertisement content is displayed to the user while the user is in proximity to traditional or digital signage, the app may also enable a user to save the advertisement content. Accordingly, the user may retrieve a saved advertisement content and view later, as exemplarily illustrated in FIG. 15.

Figure 18:
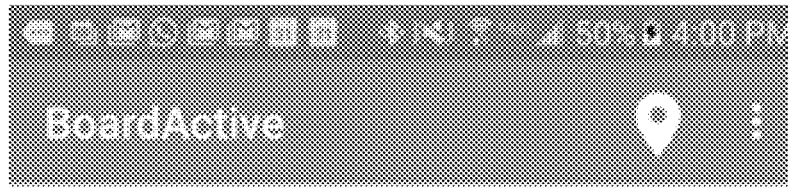
FIG. 18 illustrates a screenshot 1800 of a mobile app for delivering geolocation and time based advertisements, depicting a plurality of categories associated with advertisement content corresponding to a plurality of traditional or digital signage, in accordance with some embodiments.
Figure 18:
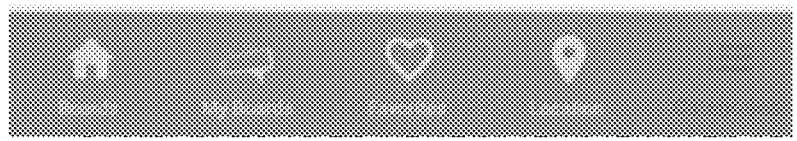

Additionally, the app may be configured to maintain a category associated with advertisement contents. As a result, the app may be able to sort the saved advertisement contents based on a category, provided by the user as exemplarily illustrated in FIG. 18.

Figure 19:
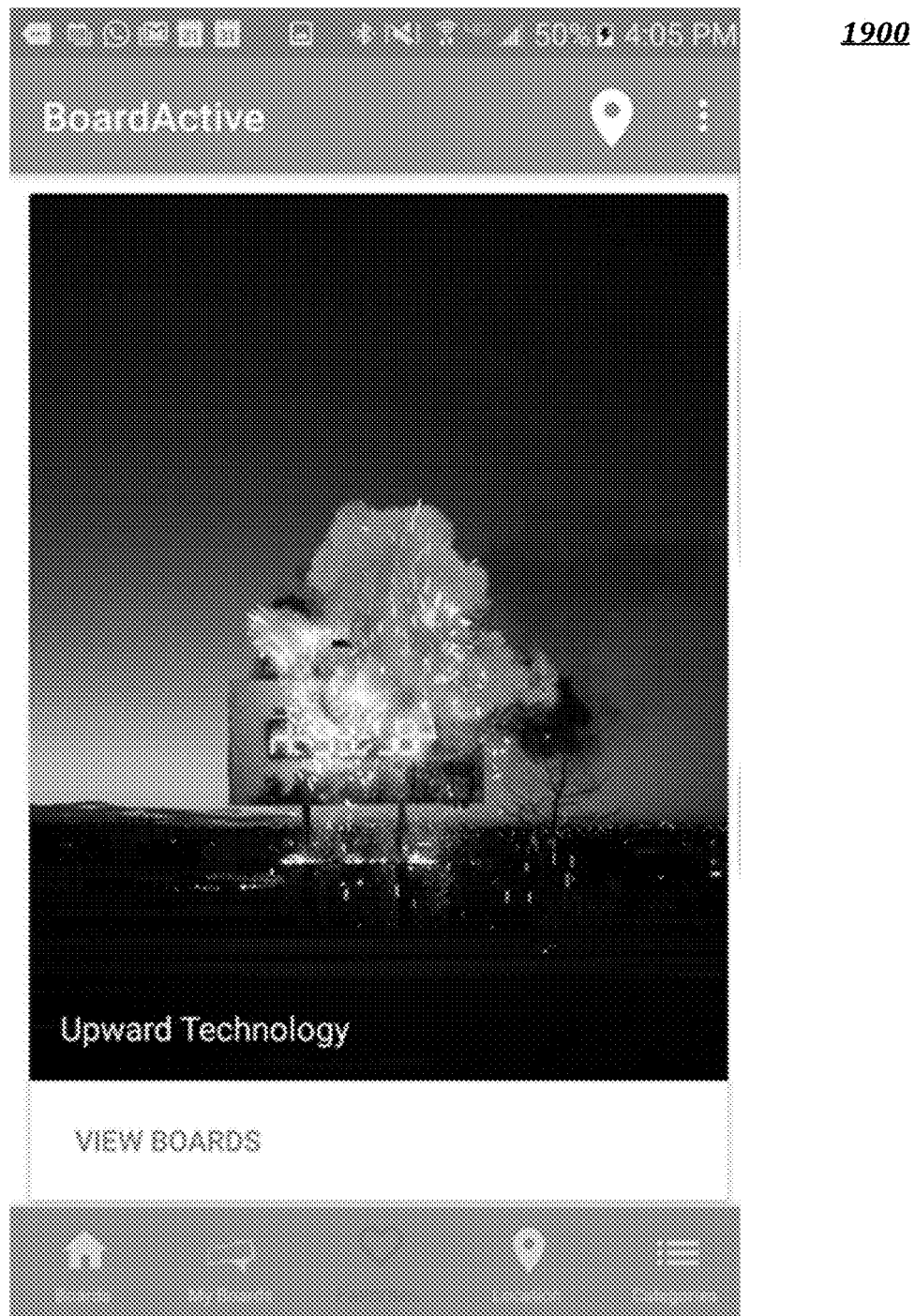
FIG. 19 illustrates a screenshot 1900 of a mobile app for delivering geolocation and time based advertisements, depicting a user interface for selecting advertisement content corresponding to traditional or digital signage as a favorite, in accordance with some embodiments.

Additionally, the app may be configured to enable the user to perform actions such as "Mark", "Favorite", "Save", and "Share" with regard to an advertisement content displayed on the mobile device, as exemplarily illustrated in FIG. 19. In this way, embodiments of the present disclosure may provide for a "tap and save" media to the consumer, and a "tap and spend" media to the advertiser. Such commands may be performed using voice command technology associated with the mobile device, enabled with a plurality of voice commands.

Further, the app may also be configured to provide the pin drop feature. Accordingly, when the user is at a location, the app may enable the user to drop a pin by touching a Pin Button on the app's GUI. Accordingly, the app may store the location on the local storage device. Subsequently, the user may select the location and view traditional or digital signage in the vicinity of the location, as exemplarily illustrated in FIG. 20. Embodiments of the present disclosure may apply to all forms of digital signage platforms, not just real and/or virtual signage.

Digital signage may be comprised of many different technological components. Any form of display (screens, tablets, kiosks, projectors, signage) that shows information may be configured as a digital signage.

Still consistent with embodiments of the present disclosure, time-based advertisements may be provided in particular geographical segments. The provision of the time-based advertisements may correspond to telecommunications and television networks (collectively referred to herein as 'tele-broadcast'). A viewer within the geographical segment of a tele-broadcast may be exposed to a plurality of advertisements during the streaming of a program. Such advertisements may be broadcasted to the viewer by an entity associated with the corresponding geographical segment.

Embodiments of the present disclosure may enable a platform user to select at least one geographical segment and at least one time at which promotional content associated with the platform user may be tele-broadcasted. The platform may then provide the promotional content and the specified at least one tele-broadcast time for broadcasting the promotional content to an entity or entities corresponding to the specified at least one geographical segment. In turn, a viewer within the geographical segment, at the specified time, may be provided with the promotional content not only via the tele-broadcast, but also through a software application associated with the platform.

In some embodiments, a viewer may have a Smart TV and/or a Digital TV connected to a local area network (LAN). In such scenarios, the software application running on a computing device on the same LAN may be enabled to determine that the viewer has been displayed the promotional content, within the geographical segment and the specified time. In turn, the software application may provide the promotional content via the software application in accordance to the embodiments disclosed herein.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 is an illustration of a platform consistent with various embodiments of the present disclosure. By way of non-limiting example, the online platform 100 for geolocation and time based advertisements may be hosted on a centralized server 110, such as, for example, a cloud computing service. The centralized server may communicate with other network entities, such as, for example, a signage equipped with wireless communication means, a mobile device (such as a smartphone, tablet, a laptop, or wireless computing devices etc.) and a client device (such as a desktop, laptop, smartphone etc.). A user, such as a manager of the online platform 100 and/or an administrator of an advertising company may access platform 100 through a software application. The software application may be embodied as, for example, but not be limited to, a website, a web application, a desktop application, and a mobile application compatible with a computing device 2100. One possible embodiment of the software application may be provided by BoardActive Suite of products and services. Accordingly, the user may provide, for example, advertisement content and one or more geographical locations corresponding to traditional or digital signage. In response, the platform may associate the advertisement content with the one or more geographical locations and accordingly deliver the advertisement content to mobile devices in the vicinity of the one or more geographical locations.

As will be detailed with reference to FIG. 21 below, the computing device through which the platform may be accessed may comprise, but not be limited to, for example, a desktop computer, laptop, a tablet, or mobile telecommunications device. As will be detailed with reference to FIG. 21 below, the computing device through which the platform may be accessed may comprise, but not be limited to, for example, Smart TV, a desktop computer, laptop, a tablet, or mobile telecommunications device. Though the present disclosure is written with reference to a mobile telecommunications device, digital signage, and TVs, it should be understood that any computing device may be employed to provide the various embodiments disclosed herein.

1. Embodiments of the present disclosure provide a platform comprised of a distributed set of modules, including, but not limited to:
   A. An Admin Module 185;
   B. A Consumer Module 165;
   C. An Activation Module 125;
   D. A Transmission Module 145; and
   E. A Data Sets 195.

In some embodiments, the present disclosure may provide an additional set of modules for further facilitating the software and hardware platform. The additional set of modules may comprise, but not be limited to:
   A. A Delivery Rules Layer;
   B. An Analytics Layer;
   C. An Admin Application UI Layer;
   D. A Consumer Tracking Layer;
   E. A Consumer Application UI Layer;
   F. A Content Interaction Layer; and
   G. A Data Layer FIG. 1 illustrates a non-limiting example of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

Still consistent with embodiments of the present disclosure, the aforementioned modules may be integrated, via an API or SDK, and be inter-configured with an existing computing application to perform various stages of the aforementioned method. For example, the API/SDK may be integrated to control:
   a. Digital content associated with an administrator;
   b. Activation Parameters for triggering a delivery of the digital content;
   c. Delivery Rules for selecting a content type to be delivered to a particular consumer;
   d. Access, Manage, and Track Consumer Profile Data; and
   e. Access, Manage, and Update External Data sets.

Consistent with embodiments of the present disclosure, activation parameters may determine what triggers an ad delivery event to commence. For example, the activation parameters may occur based on, but not limited to, the following parameters:
   A. Space;
   B. Time;
   C. Space-Time; or
   D. Image Processing.
   A. Space
   Designates a point in space for an AdDrop™, regardless of time, including, but not limited to:
       Real Space—Physically Associated with a location of a Static Object;
       Virtual Space=Area defined by coordinates on a map, but not associated with a physical object; and
       Dynamic—Objects Markers associated with mobile assets.
   B. Time
   Designates a point in time for an AdDrop™, regardless of space, including, but not limited to:
       Predefined time—Set to occur at a specific time or window of time:
           May be scheduled,
           Schedule may be obtained from an external dataset;
       Variable—Set to occur upon a triggering event:
           May be associated with a manual, Admin action, and
           For example: the Admin may be enabled to enact a triggering event by way of the Admin UI layer;
   C. Space-Time
   Designates a specific point in space at a specific point in time to be activate the AdDrop™.

Event
Corresponds to some event in a future time, but is not defined by the Admin, including, but not limited to:
Venue Schedule
Sport Schedule
Commercial Schedule
D. Image Processing
Consumer may capture an image and submit the image to the platform;
Consumer can be prompted to prove they are near a trigger.
Perform image processing will determine whether there are registered Brand Assets within an image; and
May determine an AppAddress™ associated with the registered assets.

2. Embodiments of the present disclosure provide a hardware and software platform operative as a distributed system of modules and computing elements for performing at least the following functions.

Activating an AdDrop™

Embodiments of the present disclosure are enabled to determine an instance of space and time, aligned to trigger an AdDrop™. The following section discloses, in part, what parameters may activate an AdDrop™ sequence to occur.

i. Spatial Activation

A space based activation trigger may be based at least on, but not limited to, the following.
Spatial Regions associated with an AdDrop™.
A physical media
A virtual media
May be achieved via, for example, GPS Management System.
May enable Admin to specify regions in space associated with AdDrop™ event.
Objects/Markers in Space may be associated with Ads
Certain Objects/Markers may be mobile (e.g., mobile assets),
E.G., Moving Object that is being Tracked
Bus,
Food Truck,
Delivery Vehicle,
Plumber Truck,
Moving Truck,
Person tracking, and
The like.
Such objects may be configured with a location detection module.
Embodiments of the present disclosure may access use external data sets to get up-to date coordinates on the mobile assets.
Moving Object Can Have Beacon (See Transmission Module)
May also be tracked through external data.

ii. Time Based Activation

A time based activation trigger may be based at least on, but not limited to, the following:
Predefined time
Configured to occur at unconstrained points in space, at a particular time.
Rule: "At this time, Blast All Consumers".
Variable Time
Configured to occur at unconstrained points in space, at a variable time.
May be typically associated with a manual action.
Function: "When I click this button, Blast All Users".

Event Trigger Based
Configured to occur at unconstrained points in space, at a variable time.
Example: A commercial when played, anywhere in world, at any point in time.
Commercial could be in any video format.
Could use external data to get up-to date delivery parameters.
Event Schedule for a Venue.
Game Schedule for a Sporting Event.

iii. Space/Time Based Activation

Configured to occur at unconstrained points in space, at a variable time.
Events:
Venues.
Promotional Offerings at Store Front.
In some embodiments, unlike previous triggers, where a consumer can be near a designated physical/virtual media and receive an AdDrop™ at a time (predefined, variable, or event based), the Space/Time trigger may designate a specific point in space at a specific point in time to be activate the AdDrop™.

3. Embodiments of the present disclosure provide a hardware and software platform operative by a set of methods and computer-readable media comprising instructions configured to operate the aforementioned modules and computing elements in accordance with the methods.

The methods and computer-readable media may comprise a set of instructions which when executed are configured to enable a method for inter-operating at least one of the following modules:
A. An Admin Module 185;
B. A Consumer Module 165;
C. An Activation Module 125;
D. A Transmission Module 145; and
E. A Data Sets 195.

The aforementioned modules may be inter-operated to perform a method comprising the following stages:
1. Register Assets
   a. Digital Assets
   b. Physical Assets
   c. Virtual Assets
   d. Media Assets
   e. Mobile Assets
   f. Assign AppAddress™ to the Registered Assets
2. Receive Content
   a. Associate with an AppAddress™
   b. Associate with Interactivity Rules
3. Receive Delivery parameters
   a. Receive Ad Activation Parameters
   b. Receive Ad Delivery Parameters
   c. Associate Content Type(s) with the AdDrop™ Parameters
4. Receiving Activation Command
   a. Determine Space Event Has Occurred
   b. Determine that Time trigger has occurred
   c. Determine if Space/Time Event Has Occurred
   d. Determine Device Type Used
5. Select Appropriate Ad to Transmit
   a. Receive Information About User
   b. Compare to Ad Delivery Rules
   c. Select Appropriate Content Type(s) to transmit
6. Transmit AdDrop
   a. Receive Indication of Content Interaction
   b. Ad Content may provide user with Instructions for revealing additional content (promotion)
   c. Engage User Tracking
   d. Receive Feedback from User 7. Provide Interactive Content
   a. Determine if revealing interactive content is true
   b. Bi-Directional communication with the User Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed. Moreover, various stages may be added or removed from the without altering or deterring from the fundamental scope of the depicted methods and systems disclosed herein.

4. Embodiments of the present disclosure provide a platform comprised of a distributed set of computing elements.

The platform is operative to control a computing device in furtherance of the operation of the aforementioned modules. Although the following disclosure describes one type of computing device, the platform may be comprised of more than one computing device in operation. Computing Device 2100, detailed in FIG. 21, is yet another example.

The computing device may comprise, but not limited to at least one of the following:
  A processing unit,
  A memory storage,
The computing device may be embodied as a mobile computing device,
  wherein the computing device comprises, but is not limited to,
    A tablet,
    A smartphone,
    A drone,
    A wearable device,
    A vehicle;
    Smart TV's; and
    Smart Screens.
The computing device may comprise sensing devices,
  wherein the sensing device may comprise, but is not limited to,
    A camera capturing content,
    A microphone for enabling voice commands,
    A location detection module, and
    A biometrics module;
  Wherein the location detection module is configured to:
    a. Enables the reading and communicating of location data associated with a sensing device;
    b. The location data may be obtained by way of, for example, but not limited to:
      i. Human tracking (e.g., implanted tracking chips);
      ii. GPS/IP Address/Triangulation
      iii. LAN/WAN; and
      iv. The detection of a device orientation to enable 'point and click' functionality.

In some embodiments the computing device may be embodied as any of the computing elements illustrated in FIG. 1, including, but not limited to, the Admin Module 185 and the Consumer Module 165.

In some embodiments, multiple mobile devices may be associated with a same platform user. As such, the platform may be enabled to function across devices, thereby receiving and sending data to multiple devices associated with the same platform user. In this way, the platform may be configured to track a platform user across multiple devices and communicate with the platform user at, for example, a device that is nearest to him, or a device that best fits the needs of the platform user.

Furthermore, in some embodiments, the computing device may comprise transmission module 145. Transmission module 145 may be configured to, for example, transmit content to a consumer. Such transmission may involve transmission technology, including, but not limited to:
  A. Beacon Technology;
  B. Embedded Chipset Transmission;
  C. Bluetooth;
  D. WIFI;
  E. RFID;
  F. NFC;
  G. GPS Mapping and Management system; and
  H. Other transmission missions.

In various embodiments, and as will be detailed below, transmission module 145 may be configured to cause a transmission of content through centralized server.

A. Sub-Modules Operative by the Computing Device

The computing device may be operated in accordance to multiple software modules and layers. Layers may comprise sub-modules, although, in some embodiments, the layers may constitute an entire module. The platform may be operative to control at least one of the following sub-modules of a computing device in furtherance of the execution of the instructions contained in the Admin Module 185:
  1. An Admin Application UI Layer;
  2. A Data Layer;
  3. A Delivery Rules Layer; and
  4. An Analytics Layer.

The following provides non-limiting examples of functions and features of the aforementioned layers.
  1. The Admin Application UI Layer
    a. May be configured for Stand-Alone Applications or integrated into existing applications:
      i. Example: Embedded frame within an existing web application;
    b. Enables user-control of the Computing Device;
    c. Enables user-control of the Modules of the Computing Device:
      i. An Admin Module 185;
      ii. A Consumer Module 165;
      iii. An Activation Module 125;
      iv. A Transmission Module 145; and
      v. Data Sets 195;
    d. Enables user-control of the Sub-Modules:
      i. A Delivery Rules Layer;
      ii. An Analytics Layer;
      iii. An Admin Application UI Layer;
      iv. A Consumer Tracking Layer;
      v. A Content Interaction Layer; and
      vi. A Data Layer.
  2. The Data Layer
    a. Enables asset data storage, tracking, and management of:
      i. Digital Assets;
      ii. Physical Assets;
      iii. Virtual Assets;
      iv. Media Assets; and
      v. Mobile Assets;
    b. Enables content Storage, tracking, and management;
    c. Enables Assignment of an AppAddress™ to associate assets with content;
    d. Enables consumer profile data storage, tracking, and management; and
    e. Enables communication and interoperation with Data Sets 195.

3. The Delivery Rules Layer
   a. Establishes the parameters and criteria for selecting content to be delivered to a consumer:
      i. Can be based on Activation Module Parameters:
         1. Space,
         2. Time, and
         3. Space/Time;
      ii. Can be based on Consumer Profile Parameters, including, but not limited to:
         1. Gender,
         2. Demographic,
         3. Propensity,
         4. Interest, and
         5. Behavior data;
      iii. Can be based on a device type associated with the consumer;
   b. Accesses consumer profile data for a user to receive the content:
      i. Can receive user data from the Data Layer,
      ii. Can receive user data from Tracking Layer,
      iii. Can receive user data from a CRM, and
      iv. Can receive user data from External PII Dataset;
   c. Determines if the parameters and criteria for selecting content to be delivered to a consumer is met; and
   d. Selects content to be delivered based on content that corresponds with selection parameters and criteria.
4. The Analytics Layer
   a. Tracks actions user takes through tracking devices associated with the user,
      i. Can engage in bi-directional communication with the Consumer Tracking Layer;
   b. Further tracks and logs user actions with the Ad for metrics to be compiled in association with the delivered content;
   c. Can be organized by User/Admin/AppAddress™ and various other organize can be used to Update user Profile;
   d. Can be coupled to external CRM data;
   e. Can be coupled to external PII data;
   f. Updates for Content Interactivity data,
      i. Can engage in bi-directional communication with the Content Interaction Layer; and
   g. Report back with Conversions/Behaviors/Actions/Interactions.

The platform may be operative to control at least one of the following sub-modules of a computing device in furtherance of the execution of the instructions contained in the Consumer Module 165:
1. A Consumer Application UI Layer;
2. A Content Interaction Layer; and
3. A Consumer Tracking Layer.

The following provides non-limiting examples of functions and features of the aforementioned layers.
1. The Consumer Application UI Layer
   a. May be configured for Stand-Alone Applications or integrated into existing applications:
      i. Example: Embedded frame within an existing web application;
   b. Enables user-control of the Computing Device;
   c. Enables user-control of the Modules of the Computing Device:
      i. A Consumer Module 165;
   d. Enables user-control of the Sub-Modules:
      i. A Consumer Application UI Layer; and
      ii. A Content Interaction Layer; and
   e. Enables users to share the content through various external platforms.

FIGS. 9-20 depict various embodiments of the Consumer Application UI Layer.
2. The Content Interaction Layer
   a. Operates based on interactivity rules and fulfillment criteria associated with content as established by an Admin:
      i. As rules and criteria are met, based on tracking performed by the Consumer Tracking Layer, additional content segments may be revealed;
      ii. Additional content segments may be pre-sent along with the content, thereby enabling the revealing of the additional content segments to be performed by the consumer interaction layer; and
      iii. Additional content segments may be sent after an initial content, wherein the interaction layer does not have the content until the criteria is met, after which point the additional content segments are transmitted;
   b. Enables tracking of users as they engage with the content:
      i. May operate in conjunction with the Consumer Tracking Layer to provide content interaction data; and
      ii. May update data associated with the Analytics Layer;
   c. Enables the consumer to elect to 'engage' ad, at which point tracking may begin.
3. The Consumer Tracking Layer
   a. Operates based on interactivity rules and fulfillment criteria;
   b. Tracking might not always occur, but may occur after a triggering event (e.g., consumer elects to engage the content);
   c. Can continue to track after triggering event to collect analytical data in order to determine, for example:
      i. Where the consumer went after receiving the content,
      ii. How the consumer behaved with relation to the content, and
      iii. Impression and conversion parameters associated with the content;
   d. May employ a tracking identifier (e.g., a Cookie ID or a hash):
      i. This cookie idea could be cross referenced from a plurality of external data set, and
      ii. Enabling Cross Platform Tracking;
   e. Tracking may employ, for example:
      i. Location Data,
      ii. Orientation Data,
      iii. Sensor Data,
      iv. Camera Data,
      v. Microphone data,
      vi. Telemetry Data,
      vii. Biometric Data, and
      viii. Voice Data.

Various hardware components may be used at the various stages of operations follow the method and computer-readable medium. For example, although the methods have been described to be performed by a computing device, it should be understood that, in some embodiments, different operations may be performed by different networked elements in operative communication with the computing device. For example, server 110 and/or computing device 2100 may be employed in the performance of some or all of the stages disclosed.

Figure 2:
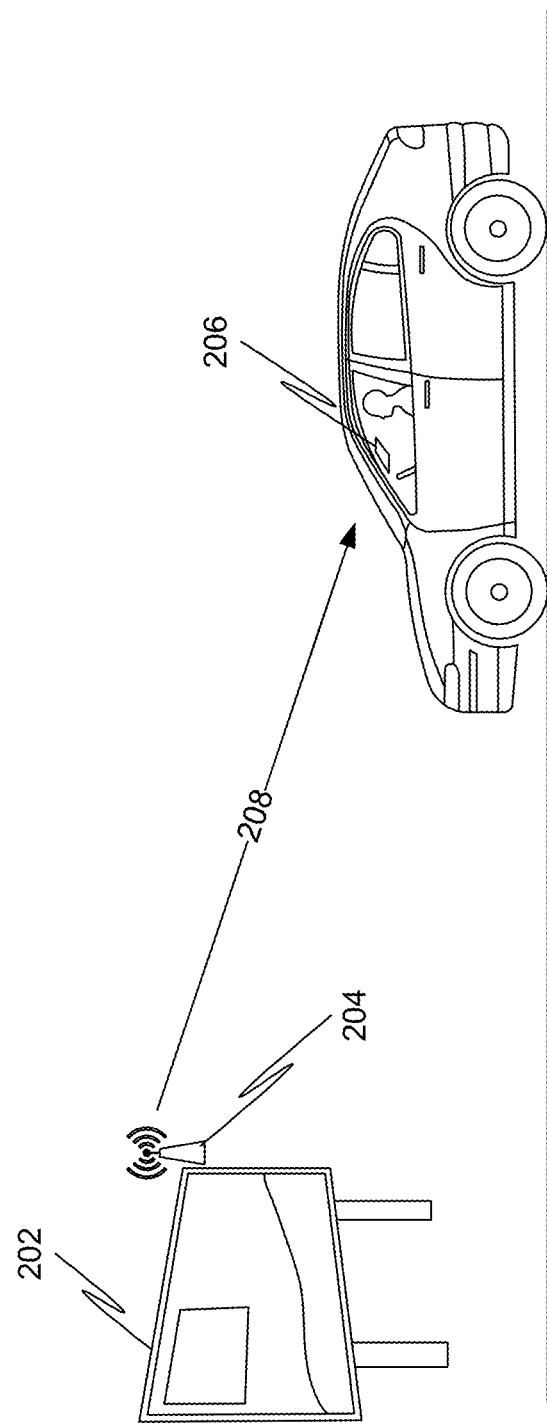
FIG. 2 illustrates delivering advertisement content associated with traditional or digital signage to a mobile device of a user by communicating with a beacon, in accordance with some embodiments.

Referring now to FIG. 2, delivering advertisement content associated with traditional or digital signage to a mobile device of a user by communicating with a beacon, in accordance with some embodiments is illustrated. As shown, in an instance, a traditional or digital signage 202 may be installed at a first geolocation. The location may not be limited to a billboard along a road as illustrated. Rather, the location may include, but not limited to, for example, a sporting event or an airport. Further, the traditional or digital signage may be equipped with a beacon 204 configured to transmit wireless signals 208 containing the advertisement content. As a mobile device 206 approaches the traditional or digital signage 202, the mobile device may be configured to receive the wireless signals 208. For example, a mobile app installed on the mobile device may regularly monitor for presence of wireless signals 208. Accordingly, when the mobile device 206 is within the transmission range of the beacon 204, the mobile app may decode the wireless signals 208 and display the advertisement content on the mobile device 206. The mobile device 206 may be operated by a user travelling by the traditional or digital signage, such as for example, in a vehicle. Although many embodiments are described herein with reference to a vehicle, any use in proximate location of the signage, whether or not in a vehicle, may be operative with the embodiments disclosed herein.

Although FIG. 2 depicts a traditional or digital signage at the first geographical location, in view of the present disclosure, it may be understood that in some embodiments, the traditional or digital signage may be empty or completely absent. In some embodiments, a virtual signage may be used. A virtual signage may be displayed to the user by, for example, but not limited to, augmented reality digital image processing techniques, or virtual reality environments. The user need not be aware of the presence of the virtual signage in their geolocation for embodiments to enable the provision of the advertisement associated with the virtual signage. Thus, by placing the beacon 204 at the first geolocation, the same end result of displaying advertisement content on the mobile device 206 in the vicinity of the first geolocation may be achieved.

Figure 3:
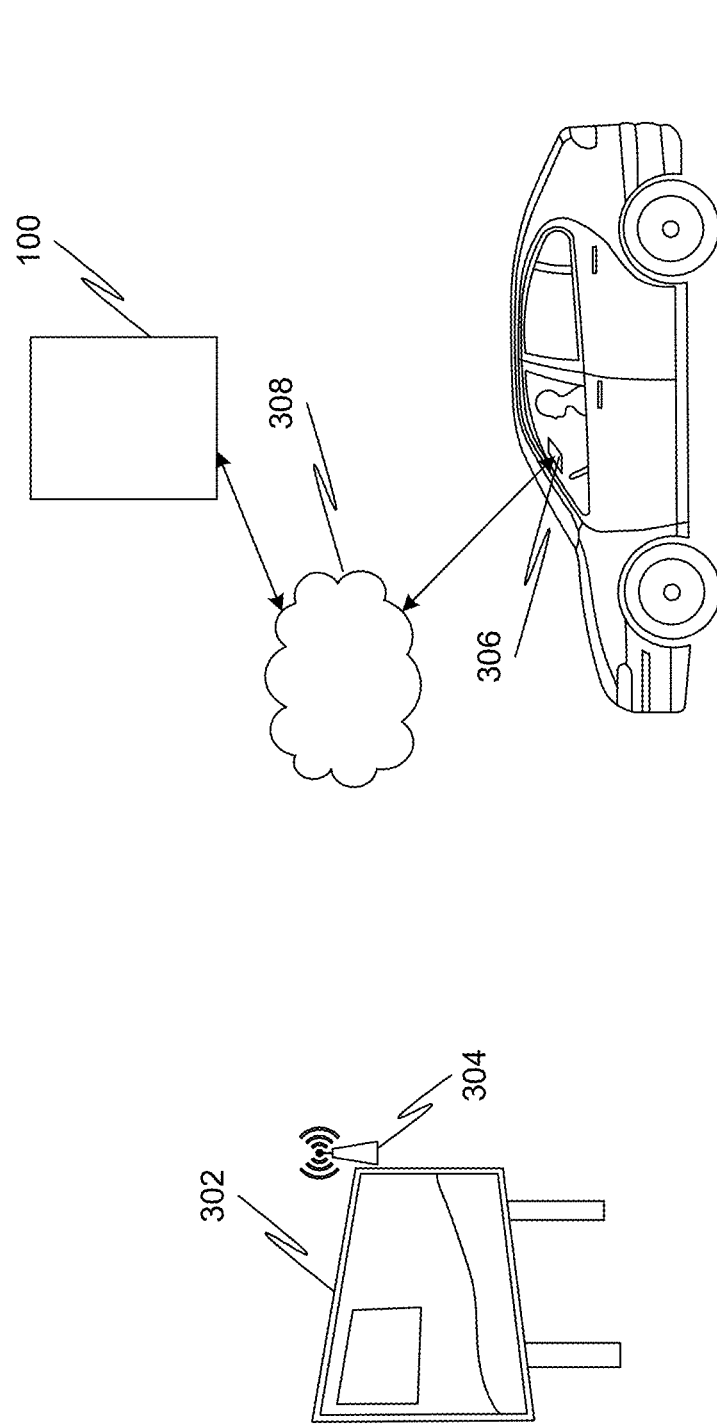
FIG. 3 illustrates delivering advertisement content associated with traditional or digital signage to a mobile device of a user by communicating with an online platform, in accordance with some embodiments.

FIG. 3 illustrates delivering advertisement content associated with traditional or digital signage to a mobile device of a user by communicating with an online platform 100, in accordance with some embodiments. It should be noted that, with some embodiments, the provision of the advertisement and the interactivity with digital signage may be with a computing device built into the user's vehicle. As shown, a traditional or digital signage 302 may be physically installed at a first geolocation. Additionally, the traditional or digital signage 302 may be equipped with a beacon 304 configured to transmit wireless signals 208 containing the advertisement content. Further, a mobile device 306 may be configured to regularly monitor a location of the mobile device. For example, a mobile app installed on the mobile device 306 may periodically query a GPS receiver on the mobile device to determine a current location of the mobile device. Further, the mobile app may be configured to regularly transmit the location of the mobile device to the online platform 100 over a communication channel 308, such as for example, wireless cellular network and/or the Internet.

Accordingly, in an instance, as the mobile device 306 approaches the traditional or digital signage 302, the mobile device may be configured to receive the wireless signals transmitted by the beacon 308. Alternatively, and/or additionally, the mobile device 306 may also receive advertisement content from the online platform upon approaching the vicinity of the traditional or digital signage. Accordingly, in an instance, advertisement content received from the beacon 308 may be augmented with advertisement content received from the online platform.

Although FIG. 3 depicts a traditional or digital signage at the first geographical location, in view of the present disclosure, it may be understood that in some embodiments, the traditional or digital signage may be empty or completely absent. Further, in an instance, even if the beacon 304 is absent at the first geolocation, the same end result of displaying the advertisement content on the mobile device 306 in the vicinity of the first geolocation may be achieved.

Figure 4:
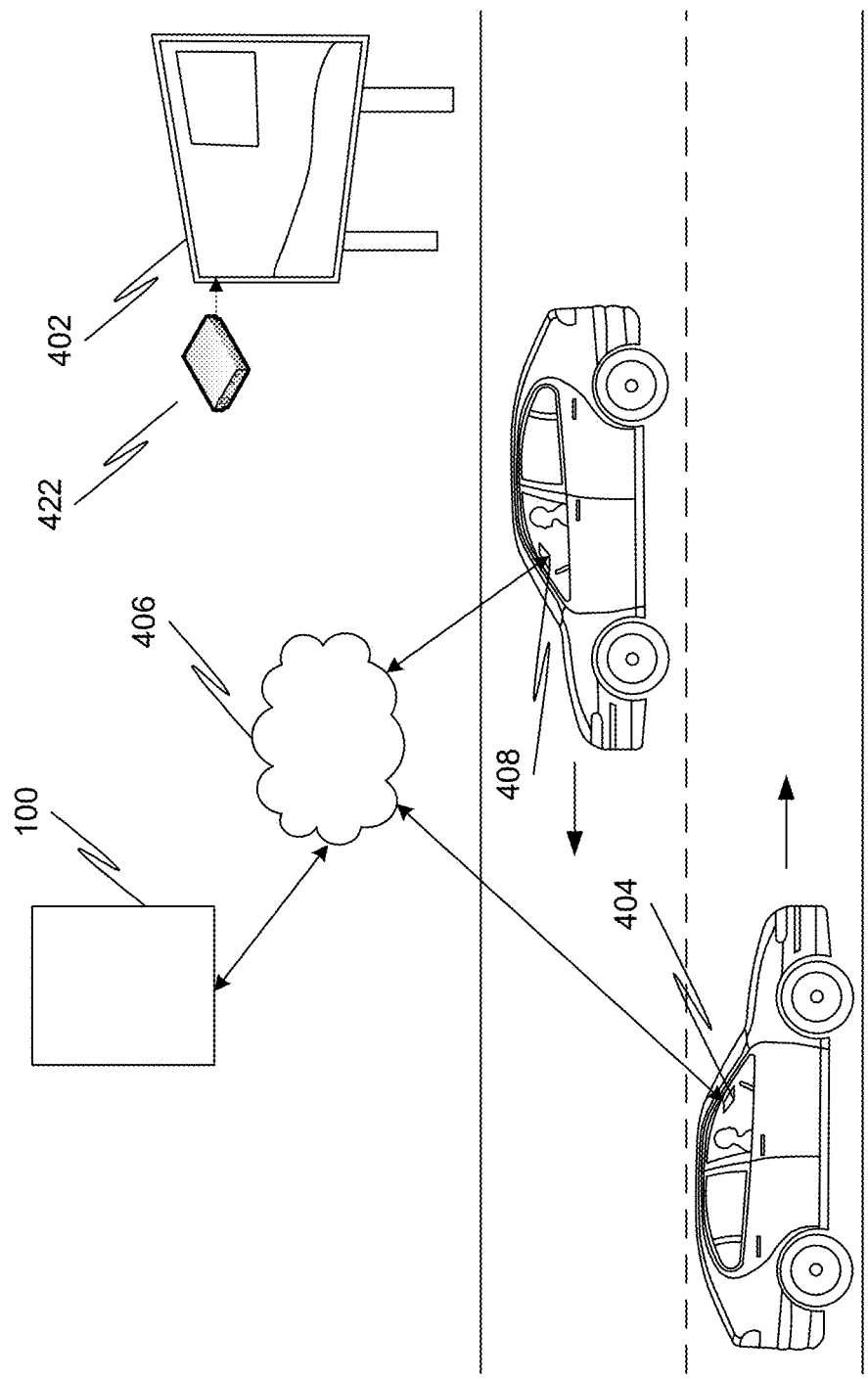
FIG. 4 illustrates delivering advertisement content associated with traditional or digital signage to a mobile device of a user based on a relative direction of the user's movement, in accordance with some embodiments.

FIG. 4 illustrates delivering advertisement content associated with traditional or digital signage to a mobile device of a user based on a relative direction of the user's movement, in accordance with some embodiments. As illustrated, a traditional or digital signage 402 may be installed at a first geolocation. Signage 402 may comprise an attachable modem 422 so as to enable signage to interface with a telecommunications network. The telecommunications network, in turn, may be in operative communication with mobile device 404.

Further, the traditional or digital signage 402 may be installed on one side of a highway such that, the traditional or digital signage 402 is visible only to users travelling on the corresponding side of highway towards a face of the traditional or digital signage 402. As a result, a mobile device 404 carried by a user travelling towards the face of the traditional or digital signage 402 may be able to receive the advertisement content corresponding to the traditional or digital signage 402. In order to achieve this, a direction of travel of the mobile device 404 in relation to the first geolocation location may be determined. The direction of travel may be determined, for example, using data received from GPS receiver on the mobile device 404 in conjunction with map information. Accordingly, a mobile app on the mobile device 404 may transmit direction of motion information to the online platform 100 through a communication channel 406 such as, for example, wireless cellular network and/or the Internet. Further, based on the direction of motion information received, the online platform 100 may determine that the traditional or digital signage 402 is intended to be visible for a user of the mobile 404. Consequently, the online platform may deliver the advertisement content to the mobile device 404.

However, users travelling on the other side of the highway away from the face of the traditional or digital signage 402 may not be able to view the traditional or digital signage 402. Accordingly, for example, a mobile device 408 operated by a user travelling away from the face of the traditional or digital signage 402 may not receive the advertisement content. Accordingly, a mobile app on the mobile device 408 may transmit direction of motion information to the online platform 100 through the communication channel 406. Further, based on the direction of motion information received, the online platform 100 may determine that the traditional or digital signage 402 is not intended to be visible for a user of the mobile 408. Consequently, the online platform may not deliver the advertisement content to the mobile device 408.

As a result, advertisement content may be delivered to users only if they are relevant. In some embodiments it can be foreseen that, for example, the advertisement content may not be relevant for users traveling away from the face of a signage since the signage may be advertising a facility that is situated ahead of the location of the signage. As a result, users who are travelling in an opposite direction may not able to visit the facility and avail of an offer advertised on the signage. Still consistent with embodiments, advertisement content may be provided based on, for example, demographic information associated with the consumer receiving the content. In this way, the content may be tailored by, for example, category, to the user.

III. Platform Operation

Although methods 500 to 800 have been described to be performed by platform 100, it should be understood that computing device 2100 may be used to perform the various stages of methods 500 to 800. Furthermore, in some embodiments, different operations may be performed by different networked elements in operative communication with computing device 2100. For example, server 110 may be employed in the performance of some or all of the stages in methods 500 to 800. Moreover, server 110 may be configured much like computing device 2100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 500 to 800 will be described in greater detail below.

Figure 5:
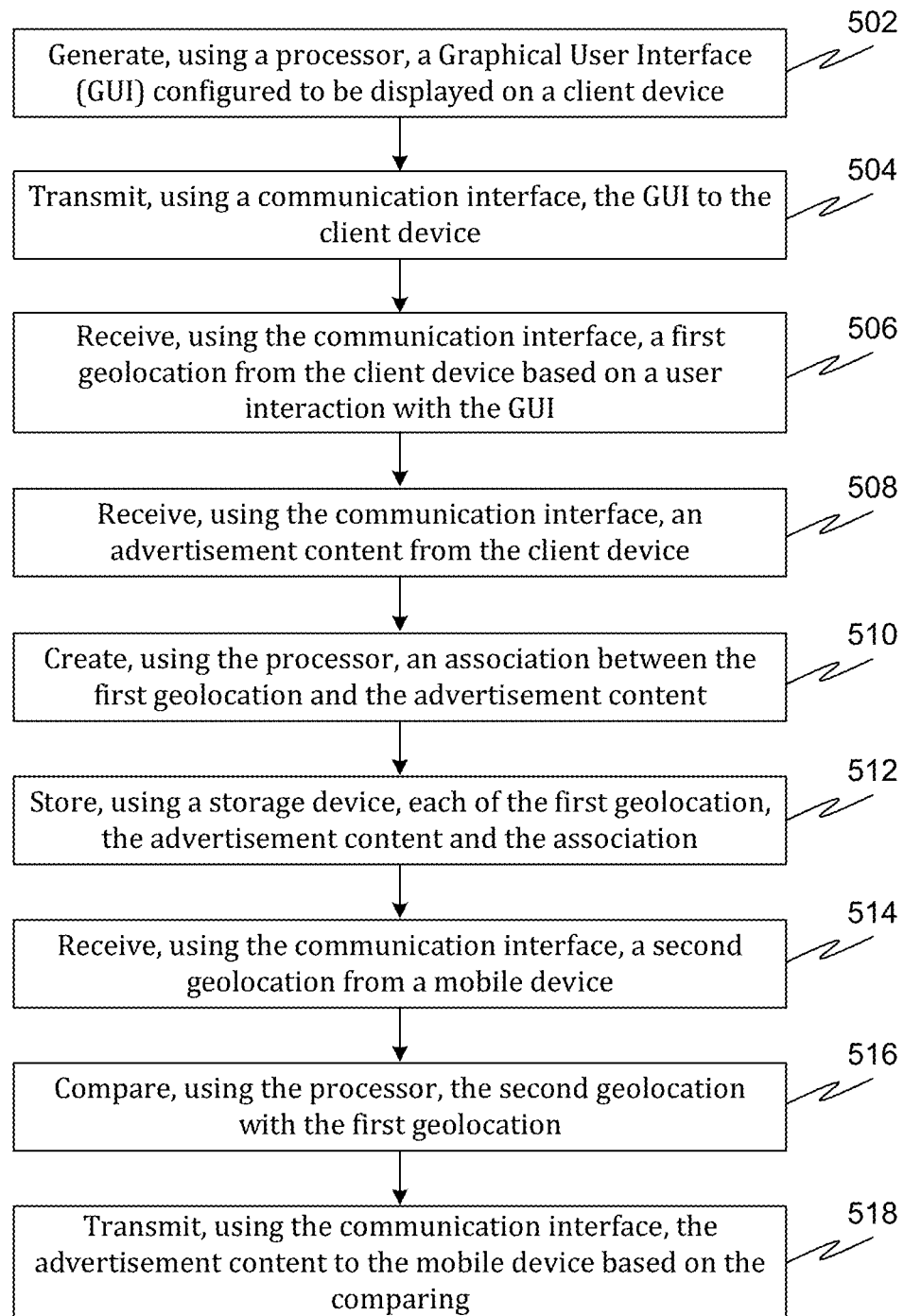
FIG. 5 illustrates a flowchart of a method 500 of geolocation and time based advertisements, in accordance with some embodiments.

FIG. 5 illustrates a flowchart of a method 500 of geolocation and time based advertisements, in accordance with some embodiments. The method 500 may include a step 502 of generating, using a processor, a Graphical User Interface (GUI) configured to be displayed on a client device. Additionally, the method 500 may include a step 504 of transmitting, using a communication interface, the GUI to the client device. Further, the method 500 may include a step 506 of receiving, using the communication interface, a first geolocation from the client device based on a user interaction with the GUI. In some embodiments, the first geolocation may be associated with at least one of a traditional or digital signage and a virtual signage. Furthermore, the method 500 may include a step 508 of receiving, using the communication interface, an advertisement content from the client device. Additionally, the method 500 may include a step 510 of creating, using the processor, an association between the first geolocation and the advertisement content. Further, the method 500 may include a step 512 of storing, using a storage device, each of the first geolocation, the advertisement content and the association. Furthermore, the method 500 may include a step 514 of receiving, using the communication interface, a second geolocation from a mobile device. The mobile device may include one or more of a smartphone, a vehicle navigation system and an in-vehicle communication system. Additionally, the method 500 may include a step 516 of comparing, using the processor, the second geolocation with the first geolocation. Further, the method 500 may include a step 518 of transmitting, using the communication interface, the advertisement content to the mobile device based on the comparing.

Further, in some embodiments, the online platform may be configured for receiving, using the communication interface, a radius from the client device. The radius may define a region centered on the first geolocation. Further, comparing the first geolocation with the second geolocation comprises determining whether the second geolocation falls within the region. As a result, the administrator of an advertising company may control an area surrounding the first geolocation within which users would receive the advertisement content.

In some embodiments, the communication interface may include a long range communication interface configured to provide communication between the online platform for geolocation and time based advertising and each of the client device and the mobile device. Alternatively, and/or additionally, in some embodiments, the communication interface may include a short range communication interface and a long range communication interface. Further, the long range communication interface may be configured to provide communication between the online platform for geolocation and time based advertising and the client device. Furthermore, the short range communication interface may be configured to provide communication between a beacon and the mobile device. Additionally, the beacon may be located in a vicinity of the first geolocation.

Figure 6:
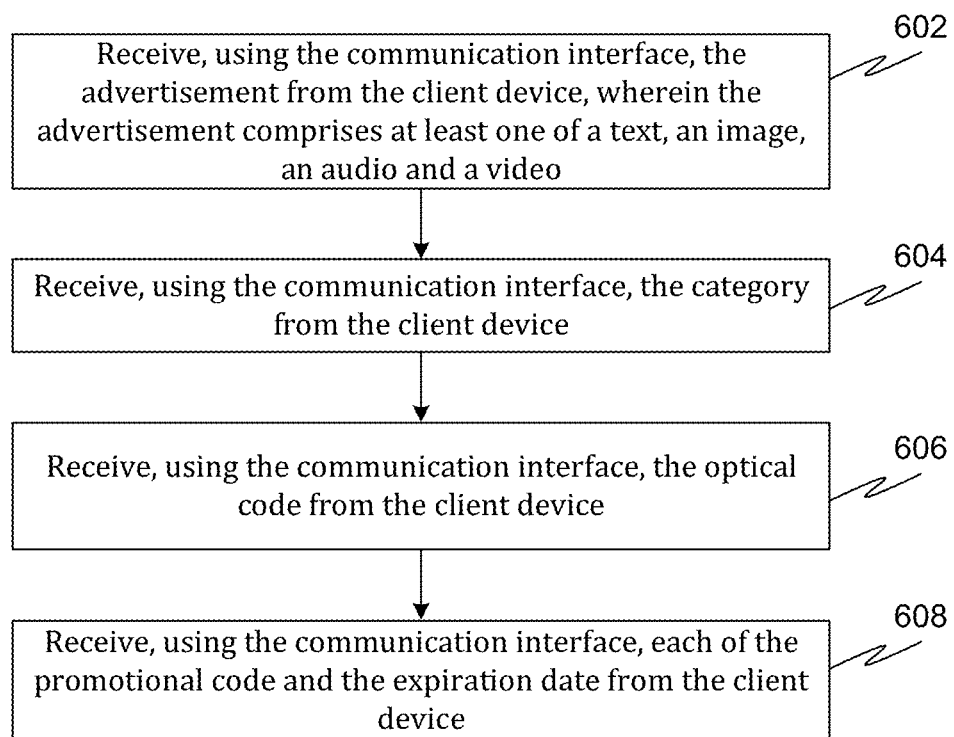
FIG. 6 illustrates a flow chart of a method 600 geolocation and time based advertisements by receiving advertisement content from a client device, in accordance with some embodiments.

FIG. 6 illustrates a flow chart of a method 600 for geolocation and time based advertisements by receiving advertisement content from a client device, in accordance with some embodiments. The advertisement content may include each of an advertisement, a category associated with the advertisement, an optical code, a promotional code, an expiration date associated with the promotional code and a URL of a webpage. Accordingly, the method 600 may include a step 602 of receiving, using the communication interface, the advertisement from the client device, wherein the advertisement comprises at least one of a text, an image, an audio and a video. Additionally, the method 600 may include a step 604 of receiving, using the communication interface, the category from the client device. Further, the method 600 may include a step 606 of receiving, using the communication interface, the optical code from the client device. Furthermore, the method 600 may include a step 608 of receiving, using the communication interface, each of the promotional code and the expiration date from the client device. Further, the method 600 may include a step 610 of receiving, using the communication interface, the URL from the client device.

An exemplary GUI for receiving the advertisement content is illustrated in FIG. 12. As shown, the GUI may enable a user, such as an administrator of an advertising company to select a file containing the image (i.e., Signage image) to be associated with the traditional or digital signage. Additionally, the GUI may provide a functionality to perform editing operations on the image, such as, but not limited to, resizing, cropping, filtering etc. Further, the GUI may also enable the administrator to select a logo to be associated with the advertisement content. Furthermore, the GUI may also enable the administrator to enter the expiration date. Moreover, the GUI may also enable the administrator to select a file containing an optical code, such as for example, a barcode or a QR code. Additionally, the GUI may also provide a functionality to create a barcode or a QR code. Additionally, and/or alternatively, the GUI may also enable the administrator to enter a promo code and an Audio/Video link, including, for example, connect point information.

In some embodiments, the category associated with the advertisement content may enable the user to manage the advertisement content in a more effective manner. For example, the user may be able to search, filter or sort advertisement contents from various real and/or virtual signage based on the category. Accordingly, using an input unit of the mobile device, the user may provide the category.

Subsequently, using a display unit of the mobile device, the advertisement associated with the category may be displayed.

Figure 7:
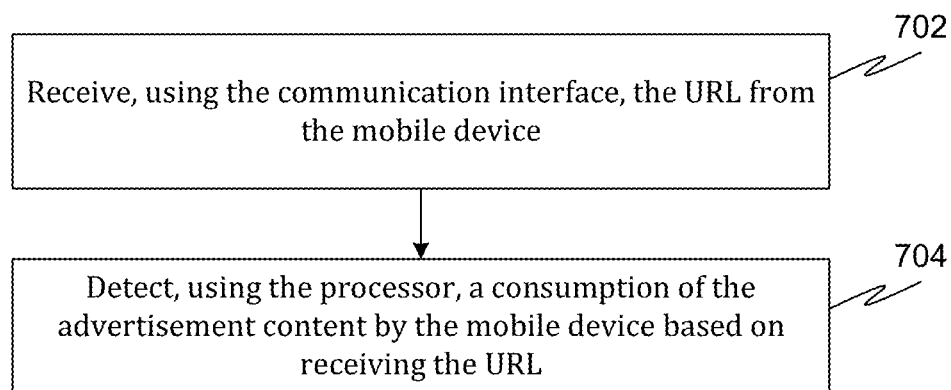
FIG. 7 illustrates a flow chart of a method 700 of detecting consumption of an advertisement content associated with traditional or digital signage, in accordance with some embodiments.

FIG. 7 illustrates a flow chart of a method 700 of detecting consumption of an advertisement content associated with traditional or digital signage, in accordance with some embodiments. In order to facilitate detecting consumption, a URL of a webpage configured for tracking requests is embedded in the advertisement content. Further, the URL is uniquely associated with the first geolocation corresponding to the traditional or digital signage. Accordingly, the method 700 may include a step 702 of receiving, using the communication interface, the URL from the mobile device. For instance, when the advertisement content is displayed on a mobile device of a user, a click operation on the URL by the user may generate a webpage request received by the online platform. Additionally, the method 700 may include a step 704 of detecting, using the processor, a consumption of the advertisement content by the mobile device based on receiving the URL. As an example, receipt of the webpage request from the mobile device is indicative of the fact that the advertisement content was displayed on the mobile device.

Further, in some embodiments, additional tracking of user activity may be performed. For example, subsequent to a click operation on the URL, the online platform may transmit, using the communication interface, a cookie to the mobile device. Further, the cookie may be configured to track user activity on the mobile device. As a result, rich user behavior data may be collected that may provide greater insights into user intent, interest etc. which may facilitate targeted advertising and user analytics.

Further, in some embodiments, based on detecting the consumption of the advertisement, advertisement statistics may be generated using the processor. The advertisement statistics may include one or more of number of views of the advertisement content, number of actions performed on the advertisement content, number of saves performed on the advertisement content, and number of shares performed on the advertisement content. Further, the advertisement statistics may be displayed along with a corresponding real and/or virtual signage, as exemplarily illustrated in FIG. 9. As a result, an advertising company may obtain immediate insights into user interaction with a corresponding real and/or virtual signage.

Figure 8:
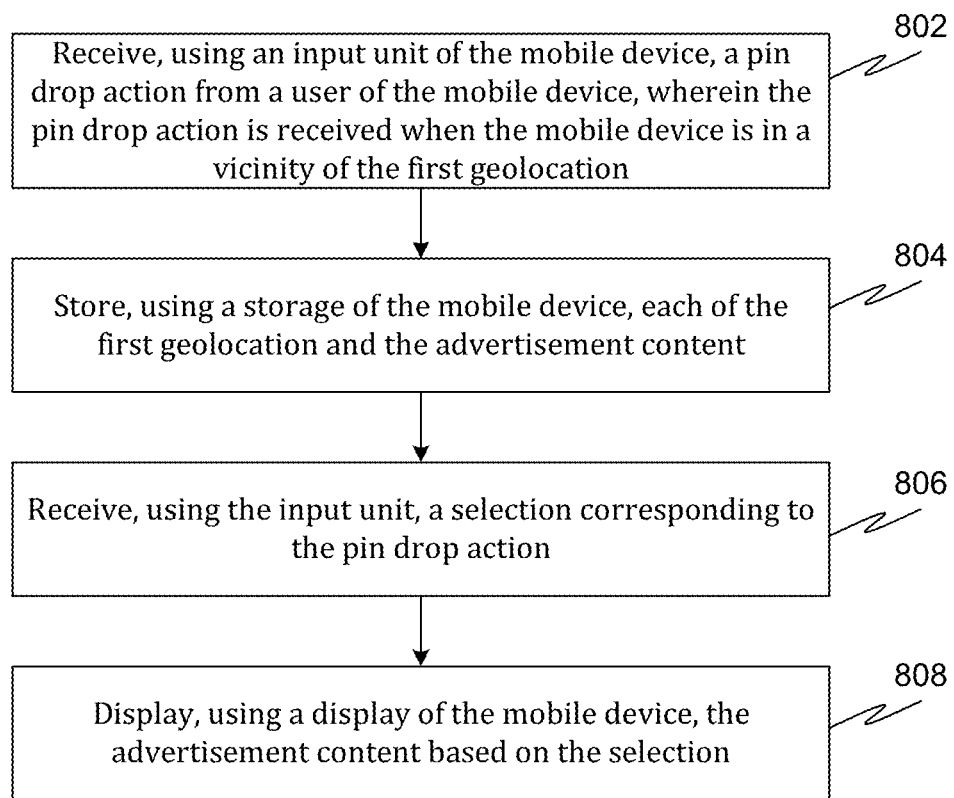
FIG. 8 illustrates a flow chart of a method 800 of providing a pin drop feature for identifying and viewing traditional or digital signage associated with a geographical location on which a pin drop action is performed, in accordance with some embodiments. Such commands may be performed using voice command technology associated with the mobile device, enabled with a plurality of voice commands.

FIG. 8 illustrates a flow chart of a method 800 of providing a pin drop feature for identifying and viewing traditional or digital signage associated with a geographical location on which a pin drop action is performed, in accordance with some embodiments. Accordingly, the method 800 may include a step 802 of receiving, using an input unit of a mobile device, a pin drop action from a user of the mobile device. Throughout the various embodiment disclosures herein, touch, voice, and gesture input may be an input medium compatible with the computing devices used. The pin drop action may be received when the mobile device is in a vicinity of the first geolocation. Further, the method 800 may include a step 804 of storing, using a storage of the mobile device, each of the first geolocation and the advertisement content. Furthermore, the method 800 may include a step 806 of receiving, using the input unit, a selection corresponding to the pin drop action. Additionally, the method 800 may include as step 808 of displaying, using a display of the mobile device, the advertisement content based on the selection.

Figure 20:
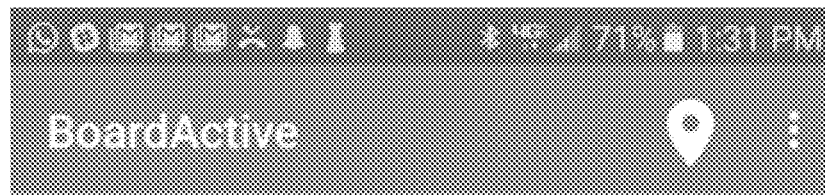
FIG. 20 illustrates a screenshot 2000 of a mobile app for delivering geolocation and time based advertisements, depicting advertisement content corresponding to one or more traditional or digital signage associated with a pin drop action, in accordance with some embodiments.

An exemplary illustration of the pin drop feature may be seen in FIG. 20. As illustrated, the screenshot 2000 of the GUI depicts two geographical locations where the user performed a pin drop action. Further, the GUI may also display a time at which the pin drop action was performed. Additionally, corresponding to each pin drop event, an option (i.e., "View Nearby Boards") may be provided for the user to view nearby real and/or virtual signage.

Although methods 2200, 2300, 2400, 2500, and 2600 have been described to be performed by platform 100, it should be understood that computing device 2100 may be used to perform the various stages of methods 2200, 2300, 2400, 2500, and 2600. Furthermore, in some embodiments, different operations may be performed by different networked elements in operative communication with computing device 2100. For example, server 110 may be employed in the performance of some or all of the stages in methods 2200, 2300, 2400, 2500, and 2600. Moreover, server 110 may be configured much like computing device 2100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 2200, 2300, 2400, 2500, and 2600 will be described in greater detail below.

Figure 22:
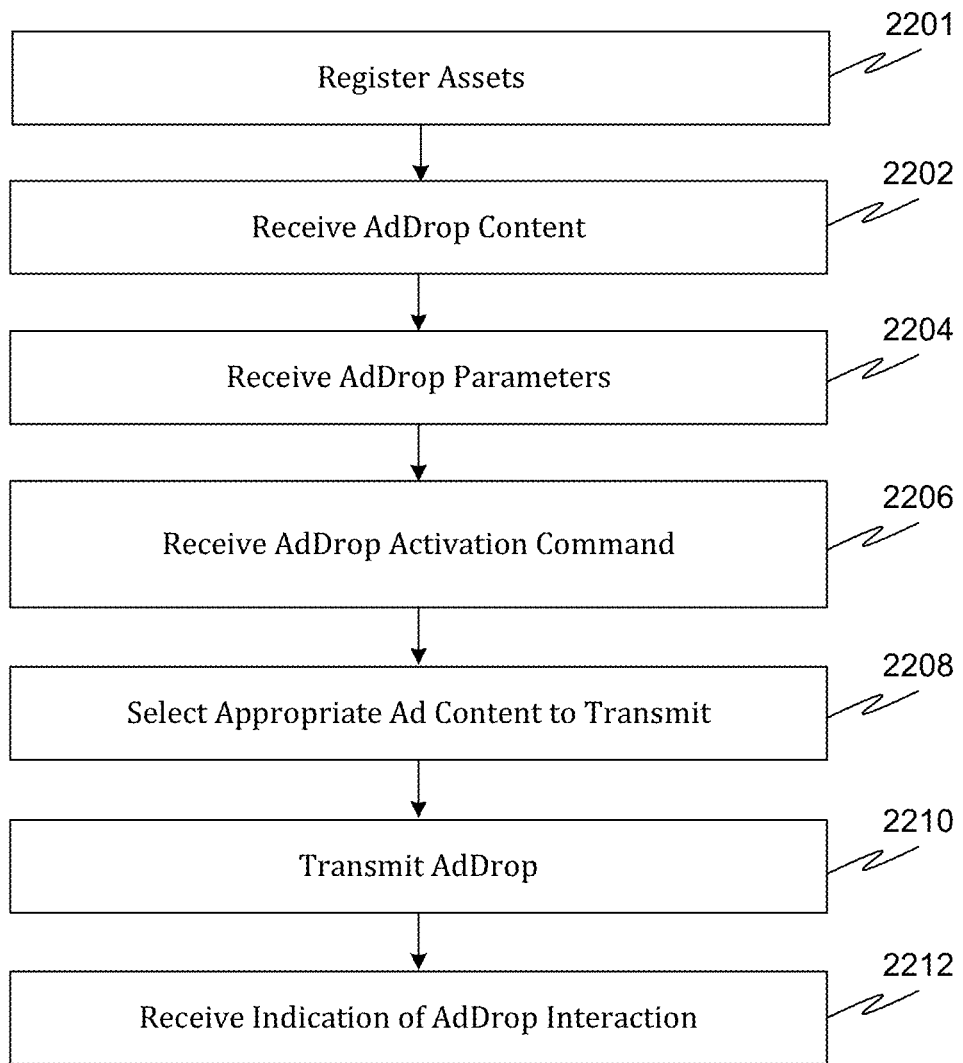
FIG. 22 illustrates a flow chart of a method for providing stand-alone application, API, or SDK, in accordance to embodiments disclosed herein.

FIG. 22 illustrates a flow chart of a method for providing stand-alone application, API, or SDK, in accordance to embodiments disclosed herein. Method 2200 may comprise the following stages and sub-stages:

Stage 2201—Registering Assets
    Assets registered may include, but not be limited to:
        A. Digital Assets,
        B. Physical Assets,
        C. Virtual Assets,
        D. Media Assets, and
        E. Mobile Assets.
    In some embodiments, the registered assets may be assigned AppAddress™.

Stage 2202—Receiving AdDrop™ Content
    The received content may be associated with an AppAddress™.
    The received content may be associated with Interactivity Rules.

Stage 2204—Receiving AdDrop™ parameters
    Ad Activation Parameters may be received.
    Ad Delivery Parameters may be received.
    Content Type(s) may be associated with the AdDrop Parameters.

Stage 2206—Receiving AdDrop™ Activation Command
    Determine if a Spatial trigger has Occurred.
    Determine if a Time-based trigger has occurred.
    Determine if a Space/Time based trigger has occurred.
    Determine a Device Type Used in order to select suitable content format.

Stage 2208—Selecting an Appropriate Ad to Transmit
    Retrieve data about consumer based on consumer profile data.
    Compare to Ad Delivery Rules against consumer profile data.
    Select appropriate content type(s) to transmit.

Stage 2210—Transmitting AdDrop™
  Receive Indication of Content Interaction.
  Ad Content may provide user with Instructions for revealing additional content (promotion).
  Engage User Tracking.
  Receive Feedback from User.
Stage 2212—Provide Interactive Content
  Determine if revealing interactive content rules and criteria are met.
  Enable Bi-Directional communication with the consumer.
  Enable Consumer Tracking to commence.

Figure 23:
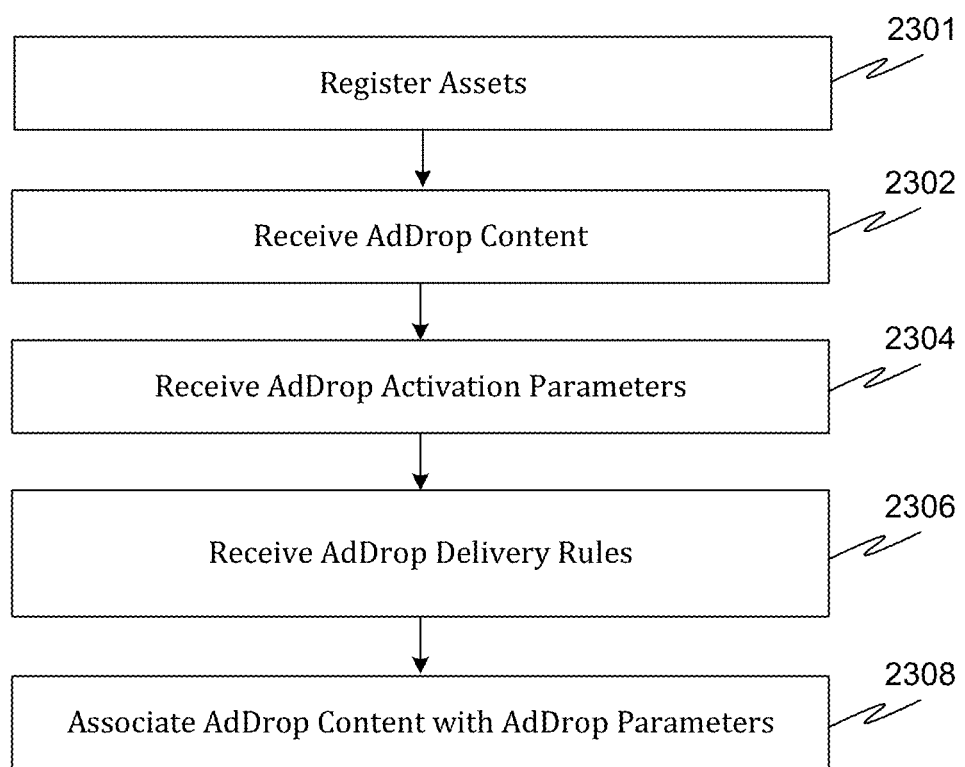
FIG. 23 illustrates a flow chart of a method for providing stand-alone application, API, or SDK, in accordance to embodiments disclosed herein.

FIG. 23 illustrates a flow chart of a method for providing stand-alone application, API, or SDK, in accordance to embodiments disclosed herein. Method 2300 may comprise the following stages and sub-stages:

Stage 2301—Registering Assets
  Assets registered may include, but not be limited to:
    A. Digital Assets,
    B. Physical Assets,
    C. Virtual Assets,
    D. Media Assets, and
    E. Mobile Assets.
  In some embodiments, the registered assets may be assigned AppAddress™
Stage 2302—Receiving AdDrop™ Content
  Content Can Be Interactive.
  Interactive content may be released in segments based on user feedback.
  Content may be different for Different User Profile types.
  Content may be different for Different User Device Types.
Stage 2304—Receive AdDrop™ Activation Parameters
A. Space
Designates a point in space for an AdDrop™, regardless of time, including, but not limited to:
  Real Space—Physically Associated with a location of a Static Object;
  Virtual Space=Area defined by coordinates on a map, but not associated with a physical object; and
  Dynamic—Objects Markers associated with mobile assets.
B. Time
Designates a point in time for an AdDrop™, regardless of space, including, but not limited to:
  Predefined time—Set to occur at a specific time or window of time:
    May be scheduled,
    Schedule may be obtained from an external dataset;
  Variable—Set to occur upon a triggering event:
    May be associated with a manual, Admin action, and
    For example: the Admin may be enabled to enact a triggering event by way of the Admin UI layer.
C. Space-Time
Designates a specific point in space at a specific point in time to be activate the AdDrop™.
  Event
    Corresponds to some event in a future time, but is not defined by the Admin, including, but not limited to:
      Venue Schedule,
      Sport Schedule, and
      Commercial Schedule.
  D. Image Processing
  Consumer may capture an image and submit the image to the platform;
    Consumer can be prompted to prove they are near a trigger.
  Perform image processing will determine whether there are registered Brand Assets within an image.
  May determine an AppAddress™ associated with the registered assets.
Stage 2306—Receiving AdDrop™ Delivery Rules
A. Based on Rules Selecting Content to Be Delivered Upon Activation
  Can receive user data from Tracking Module.
  Can receive user data from CRM module.
  Can receive user data from External PII Module.
  Gender/Demographic/Propensity/Interest/Behavior/Etc.
Stage 2306—Associating Content Type(s)
  An association is made with the activation parameters, delivery rules, to be Delivered When Activation/Rules Met.

Figure 24:
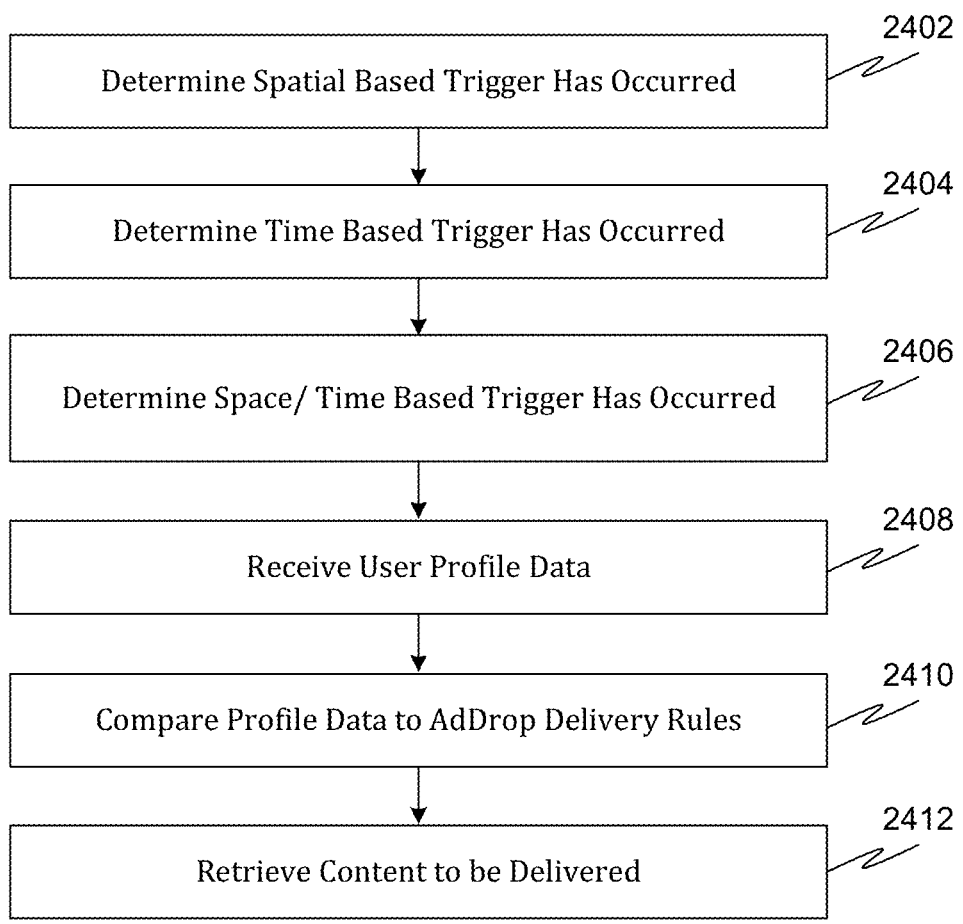
FIG. 24 illustrates a flow chart of a method for providing stand-alone application, API, or SDK, in accordance to embodiments disclosed herein.

FIG. 24 illustrates a flow chart of a method for providing stand-alone application, API, or SDK, in accordance to embodiments disclosed herein. Method 2400 may comprise the following stages and sub-stages:

Stage 2302—Determining Spatial Trigger has occurred
  Can be based on data received from consumer tracking layer.
  Can use Image Processing—Sent from the consumer.
Stage 2304—Determining that Time-Based trigger has occurred
  Determine if Space Trigger is True.
    Can Await Image Processing to Determine if by a registered asset.
Stage 2306—Determining if Space/Time Event Has Occurred
  Determine if event has occurred.
Stage 2308—Receiving Profile Data
  Can determine device type used.
  Can receive consumer data from Tracking Module.
  Can receive consumer data from CRM Module.
  Can receive consumer data from External PII Module.
  Can receive data associated with consumer Gender/Demographic/Propensity/Interest/Behavior/Etc.
Stage 2310—Comparing Profile Data
  Comparing to Ad Delivery Rules.
Stage 2312—Retrieving Content
  Look Up Content Type(s) associated with Trigger and Rules.

Figure 25:
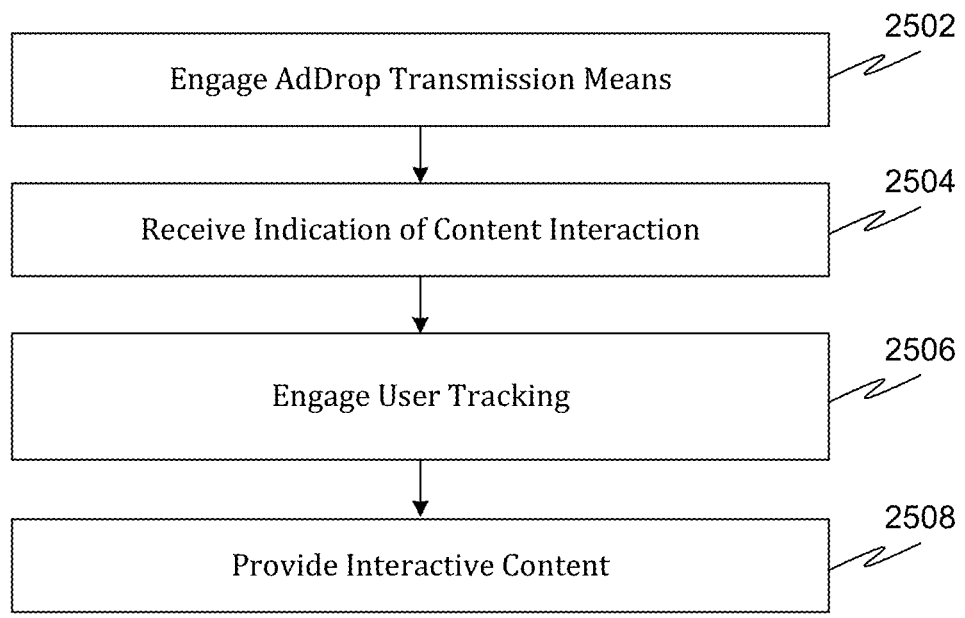
FIG. 25 illustrates a flow chart of a method for providing stand-alone application, API, or SDK, in accordance to embodiments disclosed herein.

FIG. 25 illustrates a flow chart of a method for providing stand-alone application, API, or SDK, in accordance to embodiments disclosed herein. Method 2500 may comprise the following stages and sub-stages:

Stage 2502—Engaging Ad Transmission Module
  May directly Transmit AdDrop™.
    A. E.G., Beacon Technology
  May indirectly transmit AdDror.
    A. E.G., Server 110
  May Update User Profile to Account for Ad Transmission.
Stage 2504—Receiving Indication of Content Interaction
  Ad Content may provide user with Instructions for revealing additional content (promotion).
Stage 2506—Engaging of Consumer Tracking
  May be configured to commence upon AdDrop™ receipt or interaction.
  Track for Fulfillment of Interaction Request Type.
  Receive Feedback from User.

Stage 2508—Providing Interactive Content
  Enables Bi-Directional Communication.
  Reveals based on interactivity rules associated with content.
  May Update Content.
  May Update Analytics.

Figure 26:
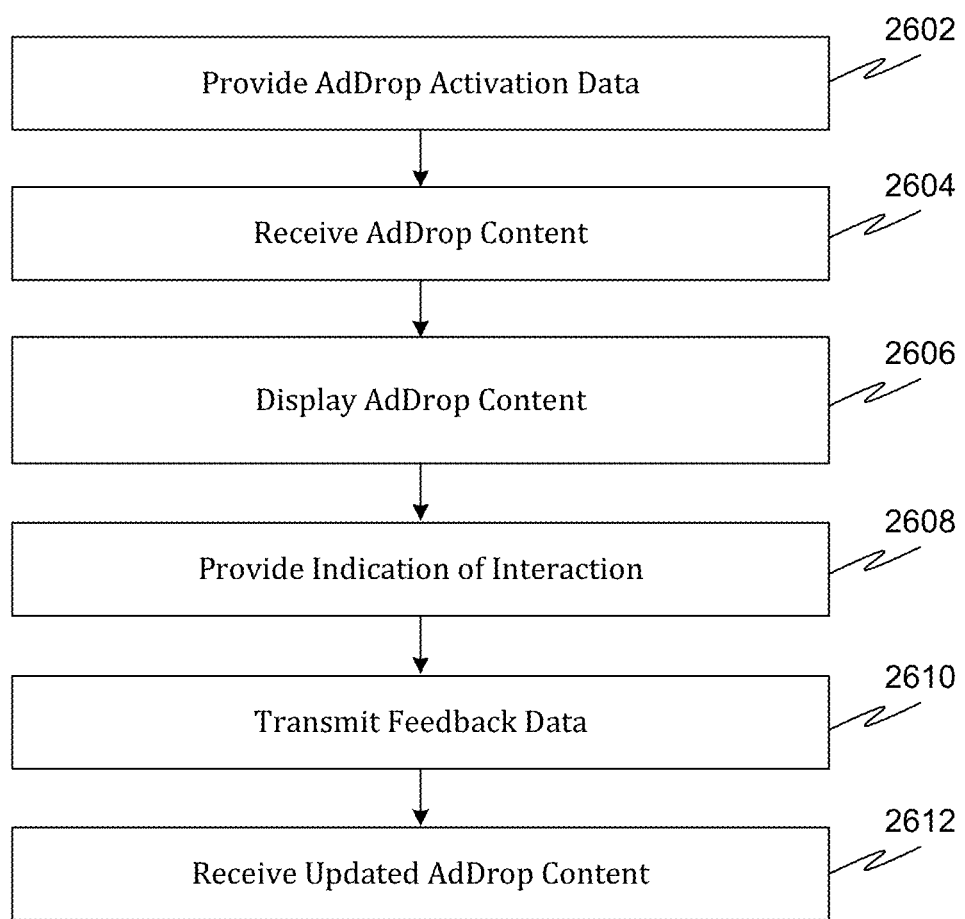
FIG. 26 illustrates a flow chart of a method for providing stand-alone application, API, or SDK, in accordance to embodiments disclosed herein.

FIG. 26 illustrates a flow chart of a method for providing stand-alone application, API, or SDK, in accordance to embodiments disclosed herein. Method 2600 may comprise the following stages and sub-stages:

Stage 2602—Providing Ad Activation Data
  May be based on Consumer Tracking Module Tracking Data.
  May be based on captured images.
    Captured images may be processed on consumer device.
    Captured images may be communicated to back-end processing device (e.g., server 110).
Stage 2604—Receiving Ad Content
  The AdDrop™ may comprise interactive content.
Stage 2606—Displaying Ad Content
  The AdDrop™ may comprise Interactive Instructions.
Stage 2608—Providing Indication of Ad Interaction
  Consumer may elect to engage in interaction.
  Interaction (e.g., tracking) may occur by default.
Stage 2610—Providing Feedback Data
  Transmits Updated Tracking Data.
  Transmits Interaction Commands.
Stage 2612—Receive Updated Content
  Additional content segments may be revealed in response to interactivity rules and criteria being met.

IV. Computing Device Architecture

The online platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 500 to 800, 2200, 2300, 2400, 2500, and 2600 have been described to be performed by a computing device 2100, it should be understood that, in some embodiments, different operations may be performed by different networked elements in operative communication with computing device 2100.

Embodiments of the present disclosure may comprise a system having a memory storage and a processing unit. The processing unit coupled to the memory storage, wherein the processing unit is configured to perform the stages of methods 500 to 800, 2200, 2300, 2400, 2500, and 2600.

Figure 21:
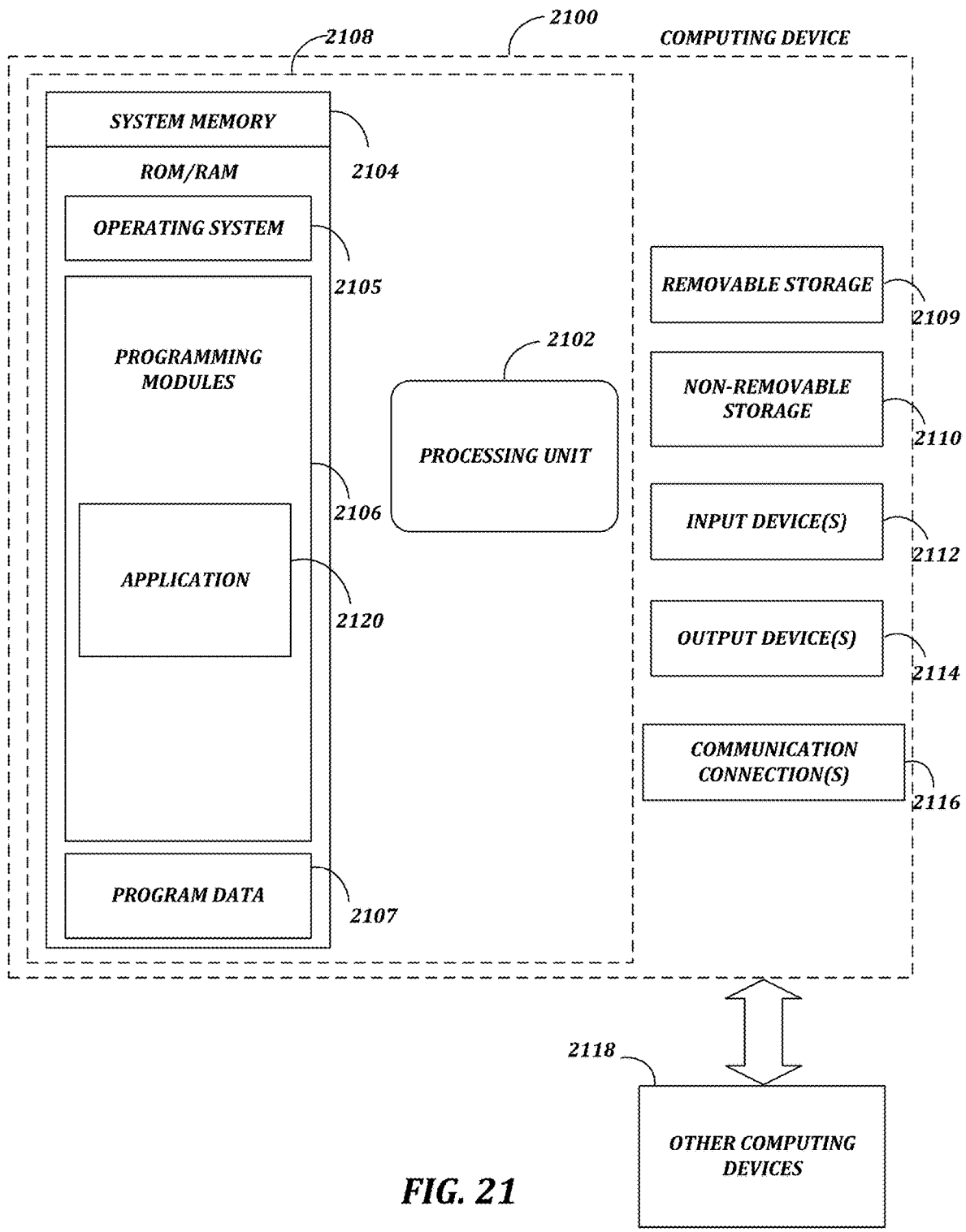
FIG. 21 illustrates a block diagram of a system for implementing the online platform for geolocation and time based advertising, in accordance with some embodiment.

FIG. 21 is a block diagram of a system including computing device 2100. Consistent with an embodiment of the disclosure, the aforementioned memory storage and processing unit may be implemented in a computing device, such as computing device 2100 of FIG. 21. Any suitable combination of hardware, software, or firmware may be used to implement the memory storage and processing unit. For example, the memory storage and processing unit may be implemented with computing device 2100 or any of other computing devices 2118, in combination with computing device 2100. The aforementioned system, device, and processors are examples and other systems, devices, and processors may comprise the aforementioned memory storage and processing unit, consistent with embodiments of the disclosure.

With reference to FIG. 21, a system consistent with an embodiment of the disclosure may include a computing device or cloud service, such as computing device 2100. Computing device 2100 may reside in the cloud. In a basic configuration, computing device 2100 may include at least one processing unit 2102 and a system memory 2104. Depending on the configuration and type of computing device, system memory 2104 may comprise, but is not limited to, volatile (e.g., random access memory (RAM)), non-volatile (e.g., read-only memory (ROM)), flash memory, or any combination. System memory 2104 may include operating system 2105, one or more programming modules 2106, and may include a program data 2107. Operating system 2105, for example, may be suitable for controlling computing device 2100's operation. In one embodiment, programming modules 2106 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 21 by those components within a dashed line 2108.

Computing device 2100 may have additional features or functionality. For example, computing device 2100 may also include additional data storage devices (removable and/or non-removable) such as, for example, magnetic disks, optical disks, or tape. Such additional storage is illustrated in FIG. 21 by a removable storage 2109 and a non-removable storage 2110. Computer storage media may include volatile and nonvolatile, removable and non-removable media implemented in any method or technology for storage of information, such as computer readable instructions, data structures, program modules, or other data. System memory 2104, removable storage 2109, and non-removable storage 2110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2100. Any such computer storage media may be part of device 2100. Computing device 2100 may also have input device(s) 2112 such as a keyboard, a mouse, a pen, a sound input device, a touch input device, etc. Output device(s) 2114 such as a display, speakers, a printer, etc. may also be included. The aforementioned devices are examples and others may be used.

Computing device 2100 may also contain a communication connection 2116 that may allow device 2100 to communicate with other computing devices 2118, such as over a network in a distributed computing environment, for example, an intranet or the Internet. Communication connection 2116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), RFID, modem, beacon technology, infrared, and other cloud-based wireless media. The term computer readable media as used herein may include both storage media and communication media.

As stated above, a number of program modules and data files may be stored in system memory 2104, including operating system 2105. While executing on processing unit 2102, programming modules 2106 (e.g., application 2120) may perform processes including, for example, stages of one or more of methods 500 to 800 as described above. The aforementioned process is an example, and processing unit 2102 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, cloud-computing, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory, which may reside in a cloud.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following disclose various Aspects of the present disclosure. The various Aspects are not to be construed as patent aspects unless the language of the Aspect appears as a patent aspect. The Aspects describe various non-limiting embodiments of the present disclosure. The aspects do not add any new matter but rather provide additional discussion surrounding the matter disclosed in the foregoing portions of the specification.

Aspect 1. A method comprising:
registering asset data, wherein registering the asset data comprises at least one of the following:
registering an image, and
registering at least one geolocation associated with the image;
receiving media content to be associated the registered asset data, wherein the media content is configured to be operative with at least one of the following: a content interaction layer and a device tracking layer,
wherein the content interaction layer is configured to enable:

an interaction with a consumer of the media content in conjunction with, at least in part, the media content, and wherein the device tracking layer is configured to enable:
a tracking of at least one action performed by the consumer of the media content in conjunction with, at least in part, the media content;

specifying at least one rule for transmitting the media content, wherein specifying the at least one rule comprises specifying at least one of the following:
a first rule associated with at least one element of profile data corresponding with the consumer,
a second rule associated with at least one action performed by the consumer, and
a third rule associated with a consumer location;

receiving captured content from a device associated with the consumer;

processing the captured content to detect the image within the captured content;

determining if the at least one rule is met; and transmitting the media content when the at least one rule is met.

Aspect 2. The method of aspect 1, wherein determining if the at least one rule is met comprises retrieving the consumer location.

Aspect 3. The method of aspect 2, wherein determining if the at least one rule is met further comprises comparing the consumer location to a first geolocation.

Aspect 4. The method of aspect 3, determining if the at least one rule is met further comprises:
tracking the consumer location; and
comparing the consumer location to a second geolocation.

Aspect 5. The method of aspect 1, wherein determining if the at least one rule is met comprises receiving an indication that the consumer has performed the at least one action.

Aspect 6. The method of aspect 5, wherein receiving the indication that the consumer has performed the at least one action comprises determining that the consumer has interacted with the media content.

Aspect 7. The method of aspect 5, further comprising, in response to receiving the indication that the consumer has performed the at least one action, determining that a conversion metric has been met.

Aspect 8. The method of aspect 5, further comprising updating the media content in response to the consumer having performed the at least one action.

Aspect 9. The method of aspect 1, wherein registering the image comprises registering a brand asset.

Aspect 10. The method of aspect 9, wherein registering the brand asset comprises registering at least one of the following:
a trade name,
a trade design,
a trade logo, and
a source-identifier associated with a brand.

Aspect 11. The method of aspect 9, wherein processing the captured content comprises processing the captured content to ascertain an object within the captured content that corresponds to the brand asset.

Aspect 12. The method of aspect 9, further comprises ascertaining that the brand asset is present within the captured content.

Aspect 13. The method of aspect 1, wherein transmitting the media content comprises delivering a plurality of content types, wherein each of the plurality of content types is configured to be delivered based on tailored rules.

Aspect 14. The method of aspect 13, further comprising tailoring at least one of: a content type and a rule to the at least one element of profile data associated with the consumer.

Aspect 15. The method of aspect 13, further comprising tailoring at least one of: a content type and a rule to a characteristic of a device type associated with the consumer.

Aspect 16. The method of aspect 5, wherein receiving the indication that the consumer has performed the at least one action comprises communicating with the device tracking layer operated on at least one device associated with the consumer.

Aspect 17. The method of aspect 16, wherein receiving the indication that the consumer has performed the at least one action comprises employing the device tracking layer to track at least one of the following:
location data,
sensor data,
telemetry data,
device usage data, and
a unique identifier.

Aspect 18. The method of aspect 7, further comprising compiling analytics based on the at least one action.

Aspect 19. The method of aspect 1, wherein transmitting the media content comprises engaging a transmission module configured to transmit the media content when the consumer is within a proximity to the at least one geolocation.

Aspect 20. The method of aspect 1, wherein specifying the at least one rule for transmitting the media content further comprises specifying a period of time.

Aspect 21. The method of aspect 20, wherein determining if the at least one rule has been met at least one of the following determining that the captured content was received within the period of time.

Aspect 22. The method of aspect 1, wherein specifying the second rule associated with the at least one action performed by the consumer comprises specifying interactivity criteria.

Aspect 23. The method of aspect 22, wherein specifying the interactivity criteria comprises specifying:
a change in a physical location associated with the consumer,
a particular destination to which the consumer must navigate, and
a particular time period in which the consumer must fulfill the interactivity criteria.

Aspect 24. The method of aspect 23, wherein determining if the at least one rule is met comprises receiving an indication that the consumer is moving at a particular path, towards the particular destination and within the particular time period.

Aspect 25. The method of aspect 23, wherein determining if the at least one rule is met comprises tracking the consumer location relative to the interactivity criteria.

Aspect 26. The method of aspect 1, further comprising wherein determining if the at least one rule is met comprises tracking, via the device tracking layer, telemetry data.

Aspect 27. The method of aspect 25, further comprising updating the media content upon a fulfillment of the interactivity criteria.

Aspect 28. The method of aspect 1, wherein receiving the media content comprises receiving the media content configured to be displayed as augmented reality content.

Aspect 29. The method of aspect 1, wherein receiving the media content comprises receiving the media content configured to be overlaid on the captured content from the device associated with the consumer.

Aspect 30. A method comprising:
specifying an advertising asset;
receiving media content to be associated with the advertising asset;
specifying at least one condition for transmitting the media content, wherein specifying the at least one condition comprises specifying at least one of the following:
a first condition associated with at least one element of profile data corresponding with a device configured to receive the media content,
a second condition associated with at least one action performed by the device, and
a third condition associated with a device location;
receiving a content captured by the device;
detecting the advertising asset with the captured content;
determining whether the at least one condition for transmitting the media content has been met; and
transmitting the media content.

Aspect 31. The method of aspect 30, wherein determining whether the at least one condition is met comprises retrieving the device location.

Aspect 32. The method of aspect 31, wherein determining whether the at least one condition is met further comprises comparing the device location to a first geolocation.

Aspect 33. The method of aspect 32, determining whether the at least one condition is met further comprises:
tracking the device location; and
comparing the device location to a second geolocation.

Aspect 34. The method of aspect 30, wherein determining whether the at least one condition is met comprises receiving an indication that the device has performed the at least one action.

Aspect 35. The method of aspect 34, wherein receiving the indication that the device has performed the at least one action comprises determining that a user of the device has interacted with the media content.

Aspect 36. The method of aspect 34, further comprising, in response to receiving the indication that the device has performed the at least one action, determining that a conversion metric has been met.

Aspect 37. The method of aspect 34, further comprising updating the media content at the device in response to the device having performed the at least one action.

Aspect 38. The method of aspect 30, wherein specifying the advertising asset comprises specifying an image.

Aspect 39. The method of aspect 38, wherein specifying the image comprises specifying at least one of the following:
a trade name,
a trade design,
a trade logo, and
a source-identifier associated with a brand.

Aspect 40. The method of aspect 38, wherein detecting the advertising asset with the captured content comprises processing the captured content to ascertain the image within the captured content.

Aspect 41. The method of aspect 30, wherein transmitting the media content comprises delivering a plurality of content types, wherein each of the plurality of content types is configured to be delivered based on tailored rules.

Aspect 42. The method of aspect 41, further comprising tailoring at least one of: a content type and a rule to a characteristic of a device type.

Aspect 43. The method of aspect 34, wherein receiving the indication that the device has performed the at least one action comprises communicating with a device tracking layer operated on the device.

Aspect 44. The method of aspect 43, wherein receiving the indication that the device has performed the at least one action comprises employing the device tracking layer to track at least one of the following:
location data,
sensor data,
telemetry data,
device usage data, and
a unique identifier.

Aspect 45. The method of aspect 44, further comprising compiling analytics based on the at least one action.

Aspect 46. The method of aspect 30, wherein transmitting the media content comprises engaging a transmission module configured to transmit the media content when the device is within a proximity to the specified device location.

Aspect 47. The method of aspect 30, wherein specifying the at least one condition for transmitting the media content further comprises specifying a period of time.

Aspect 48. The method of aspect 47, wherein determining whether the at least one condition has been met at least one of the following determining that the captured content was received within the period of time.

Aspect 49. The method of aspect 30, wherein specifying the second condition associated with the at least one action performed by the device comprises specifying interactivity criteria.

Aspect 50. The method of aspect 49, wherein specifying the interactivity criteria comprises specifying:
a change in a physical location associated with the device,
a particular destination at which the device must arrive, and
a particular time period in which the device must indicate a fulfillment of the interactivity criteria.

Aspect 51. The method of aspect 50, wherein determining whether the at least one condition is met comprises receiving an indication that the device is moving at a particular path, towards the particular destination and within the particular time period.

Aspect 52. The method of aspect 49, wherein determining whether the at least one condition is met comprises tracking the device location relative to the interactivity criteria.

Aspect 53. The method of aspect 30, further comprising wherein determining whether the at least one condition is met comprises tracking, via a device tracking layer, telemetry data.

Aspect 54. The method of aspect 49, further comprising updating the media content upon a fulfillment of the interactivity criteria.

Aspect 55. The method of aspect 30, wherein receiving the media content comprises receiving the media content configured to be displayed as augmented reality content.

Aspect 56. The method of aspect 30, wherein receiving the media content comprises receiving the media content configured to be overlaid on the content captured by the device.

Aspect 57. A computer-readable medium comprising a set of instructions which when executed perform a method, the method comprising:
specifying a brand asset, wherein specifying the brand asset comprises specifying at least one of the following:
a trade name,
a trade dress,
a logo, and a source-identifier associated with a brand;
specifying interactive content to be associated with the brand asset,
wherein the interactive content is configured to be operative with a content interaction layer on a device configured to receive the interactive content,
wherein the content interaction layer is configured to enable an interaction between a user of the device and the interactive content;
specifying at least one condition for transmitting the interactive content, wherein specifying the at least one condition comprises specifying at least one action performed by the device;
receiving a captured content from the device;
detecting the brand asset with the captured content;
determining whether the at least one condition for transmitting the interactive content has been met; and
transmitting the interactive content.

Aspect 58. The computer-readable medium of aspect 57, wherein determining whether the at least one condition is met comprises retrieving a device location.

Aspect 59. The computer-readable medium of aspect 58, wherein determining whether the at least one condition is met further comprises comparing the device location to a first geolocation.

Aspect 60. The computer-readable medium of aspect 59, determining whether the at least one condition is met further comprises:
tracking the device location; and
comparing the device location to a second geolocation.

Aspect 61. The computer-readable medium of aspect 57, wherein determining whether the at least one condition is met comprises receiving an indication that the device has performed the at least one action.

Aspect 62. The computer-readable medium of aspect 61, wherein receiving the indication that the device has performed the at least one action comprises determining that the user has interacted with the interactive content.

Aspect 63. The computer-readable medium of aspect 61, further comprising, in response to receiving the indication that the device has performed the at least one action, determining that a conversion metric has been met.

Aspect 64. The computer-readable medium of aspect 61, wherein receiving the indication that the device has performed the at least one action comprises communicating with a device tracking layer operated on the device.

Aspect 65. The computer-readable medium of aspect 64, wherein receiving the indication that the device has performed the at least one action comprises employing the device tracking layer to track at least one of the following:
location data,
sensor data,
telemetry data,
device usage data, and
a unique identifier.

Aspect 66. The computer-readable medium of aspect 65, further comprising compiling analytics based on the at least one action.

Aspect 67. The computer-readable medium of aspect 57, wherein specifying the at least one condition for transmitting the interactive content further comprises specifying a location.

Aspect 68. The computer-readable medium of aspect 67, wherein transmitting the interactive content comprises engaging a transmission module configured to transmit the interactive content when the device is within a proximity to a specified location.

Aspect 69. The computer-readable medium of aspect 57, wherein specifying the at least one condition for transmitting the interactive content further comprises specifying a period of time.

Aspect 70. The computer-readable medium of aspect 69, wherein determining whether the at least one condition has been met at least one of the following determining that the captured content was received within the period of time.

Aspect 71. The computer-readable medium of aspect 57, wherein specifying the at least one action performed by the device comprises specifying interactivity criteria.

Aspect 72. The computer-readable medium of aspect 71, wherein specifying the interactivity criteria comprises specifying:
a change in a physical location associated with the device,
a particular destination at which the device must arrive, and
a particular time period in which the device must indicate a fulfillment of the interactivity criteria.

Aspect 73. The computer-readable medium of aspect 72, wherein determining whether the at least one condition is met comprises receiving an indication that the device is moving at a particular path, towards the particular destination and within the particular time period.

Aspect 74. The computer-readable medium of aspect 71, wherein determining whether the at least one condition is met comprises tracking a device location relative to the interactivity criteria.

Aspect 75. The computer-readable medium of aspect 57, further comprising wherein determining whether the at least one condition is met comprises tracking, via a device tracking layer, telemetry data.

Aspect 76. The computer-readable medium of aspect 71, further comprising updating the interactive content upon a fulfillment of the interactivity criteria.

Aspect 77. The computer-readable medium of aspect 57, further comprising updating the interactive content at the device in response to the device having performed the at least one action.

Aspect 78. The computer-readable medium of aspect 57, wherein detecting the brand asset with the captured content comprises processing the captured content to detect an image within the captured content.

Aspect 79. The computer-readable medium of aspect 57, wherein specifying the interactive content comprises receiving the interactive content configured to be displayed as augmented reality content.

Aspect 80. The computer-readable medium of aspect 57, wherein specifying the interactive content comprises receiving the interactive content configured to be overlaid on the captured content from the device.

Aspect 81. The computer-readable medium of aspect 57, wherein specifying the interactive content comprises specifying a uniform resource locator (URL) at which the interactive content can be provided.

Aspect 82. The computer-readable medium of aspect 81, wherein transmitting the interactive content comprises transmitting the URL.

Aspect 83. The computer-readable medium of aspect 57, further comprising associating a digitized image code with the brand asset.

Aspect 84. The computer-readable medium of aspect 83, wherein detecting the brand asset within the captured content comprises detecting the digitized image code.

Aspect 85. A method of geolocation and time based advertising, the method comprising:

generating, using a processor, a user interface configured to be displayed on a client device;

transmitting, using a communication interface, the user interface to the client device;

receiving, using the communication interface, a first geolocation from the client device based on a user interaction with the user interface;

receiving, using the communication interface, an advertisement content from the client device;

creating, using the processor, an association between the first geolocation and the advertisement content;

storing, using a storage device, each of the first geolocation, the advertisement content and the association;

receiving, using the communication interface, a second geolocation from a mobile computing device;

comparing, using the processor, the second geolocation with the first geolocation; and transmitting, using the communication interface, the advertisement content to the mobile computing device based on the comparing.

Aspect 86. The method of aspect 85, wherein the first geolocation is associated with at least one of a tradition signage, a digital signage and a virtual signage.

Aspect 87. The method of aspect 85, wherein the advertisement content comprises each of an advertisement, a category associated with the advertisement, an optical code, a promotional code, an expiration date associated with the promotional code and a URL of a webpage, wherein the method further comprises:

receiving, using the communication interface, the advertisement from the client device, wherein the advertisement comprises at least one of a text, an image, an audio and a video;

receiving, using the communication interface, the category from the client device;

receiving, using the communication interface, the optical code from the client device;

receiving, using the communication interface, each of the promotional code and the expiration date from the client device; and receiving, using the communication interface, the URL from the client device.

Aspect 88. The method of aspect 87, further comprising:

receiving, using an input unit of the mobile device, the category from a user of the mobile device;

displaying, using a display unit of the mobile device, the advertisement associated with the category.

Aspect 89. The method of aspect 85, wherein the advertisement content comprises of a URL of a webpage, wherein the URL is uniquely associated with the first geolocation, wherein the method further comprises:

receiving, using the communication interface, the URL from the mobile device; and detecting, using the processor, a consumption of the advertisement content by the mobile device based on receiving the URL.

Aspect 90. The method of aspect 89, further comprising transmitting, using the communication interface, a cookie to the mobile device, wherein the cookie is configured to track user activity on the mobile device.

Aspect 91. The method of aspect 90, further comprising generating, using the processor, advertisement statistics based on detecting the consumption of the advertisement.

Aspect 92. The method of aspect 91, wherein the advertisement statistics comprises at least one of number of views of the advertisement content, number of actions performed on the advertisement content, number of saves performed on the advertisement content, and number of shares performed on the advertisement content.

Aspect 93. The method of aspect 85, further comprises receiving, using the communication interface, a radius from the client device, wherein the radius defines a region centered on the first geolocation, wherein comparing the first geolocation with the second geolocation comprises determining whether the second geolocation falls within the region.

Aspect 94. The method of aspect 85, wherein the communication interface comprises a long range communication interface configured to provide communication between an online platform for geolocation and time based advertising and each of the client device and the mobile device.

Aspect 95. The method of aspect 85, wherein the communication interface comprises a short range communication interface and a long range communication interface, wherein the long range communication interface is configured to provide communication between an online platform for geolocation and time based advertising and the client device, wherein the short range communication interface is configured to provide communication between a beacon and the mobile device, wherein the beacon is located in a vicinity of the first geolocation.

Aspect 96. The method of aspect 85, further comprising:

receiving, using an input unit of the mobile device, a pin drop action from a user of the mobile device, wherein the pin drop action is received when the mobile device is in a vicinity of the first geolocation;

storing, using a storage of the mobile device, each of the first geolocation and the advertisement content;

receiving, using the input unit, a selection corresponding to the pin drop action; and displaying, using a display of the mobile device, the advertisement content based on the selection.

Aspect 97. The method of aspect 85, wherein the mobile device comprises at least one of a smartphone and a vehicle navigation system, wherein the vehicle navigation system includes a map of proximate signage media.

Aspect 98. A platform for geolocation and time based advertising, the online platform comprising:

a communication interface configured to:
  transmit a GUI to a client device;
  receive a first geolocation from the client device based on a user interaction with the GUI;
  receive an advertisement content from the client device;
  receive a second geolocation from a mobile device;
  transmit the advertisement content to the mobile device based on a comparison between the first geolocation and the second geolocation;

a processor configured to:
  generate the GUI configured to be displayed on the client device;
  create an association between the first geolocation and the advertisement content;
  compare the second geolocation with the first geolocation; and a storage device configured to store each of the first geolocation, the advertisement content and the association.

Aspect 99. The platform of aspect 98, wherein the first geolocation is associated with at least one of a traditional or digital signage and a virtual signage.

Aspect 100. The platform of aspect 98, wherein the advertisement content comprises each of an advertisement, a category associated with the advertisement, an optical code, a promotional code, an expiration date associated with the promotional code and a URL of a webpage, wherein the communication interface is further configured to:
  receive the advertisement from the client device, wherein the advertisement comprises at least one of a text, an image, an audio and a video;
  receive the category from the client device;
  receive the optical code from the client device;
  receive each of the promotional code and the expiration date from the client device; and
  receive the URL from the client device.

Aspect 101. The platform of aspect 98, wherein the advertisement content comprises of a URL of a webpage, wherein the URL is uniquely associated with the first geolocation, wherein the communication interface is further configured to receive the URL from the mobile device, wherein the processor is further configured to detect a consumption of the advertisement content by the mobile device based on receiving the URL.

Aspect 102. The platform of aspect 98, wherein the communication interface is further configured to transmit a cookie to the mobile device, wherein the cookie is configured to track user activity on the mobile device.

Aspect 103. The online platform of aspect 101, wherein the processor is further configured to generate advertisement statistics based on detecting the consumption of the advertisement.

Aspect 104. The platform of aspect 103, wherein the advertisement statistics comprises at least one of number of views of the advertisement content, number of actions performed on the advertisement content, number of saves performed on the advertisement content, and number of shares performed on the advertisement content.

Aspect 105. The platform of aspect 98, the communication interface is further configured to receive a radius from the client device, wherein the radius defines a region centered on the first geolocation, wherein comparing the first geolocation with the second geolocation comprises determining whether the second geolocation falls within the region.

Aspect 106. The platform of aspect 98, wherein the communication interface comprises a long range communication interface configured to provide communication between an online platform for geolocation and time based advertising and each of the client device and the mobile device.

Aspect 107. The platform of aspect 98, wherein the communication interface comprises a short range communication interface and a long range communication interface, wherein the long range communication interface is configured to provide communication between an online platform for geolocation and time based advertising and the client device, wherein the short range communication interface is configured to provide communication between a beacon and the mobile device, wherein the beacon is located in a vicinity of the first geolocation.

Aspect 108. The platform of aspect 98, wherein the mobile device comprises at least one of a smartphone and a vehicle navigation system.

Aspect 109. A method comprising:
  specifying a content distribution campaign, the content distribution campaign comprising;
    a geolocation, and
    media content associated with the geolocation;
  specifying a plurality of rules for the content distribution campaign, wherein specifying the plurality of rules comprises:
    specifying a first rule corresponding to a period of time,
    specifying a second rule corresponding to at least one element of profile data associated with a consumer, and
    specifying a third rule corresponding to a course of travel associated with the consumer;
  receiving a first indication that the consumer is at a first location within a radius of the geolocation;
  assessing, in response to the first indication, the at least one element of profile data associated with the consumer;
  receiving a second indication that the consumer is at a second location; determining the course of travel based, at least in part, on an analysis of the first location and the second location; and
  establishing that the consumer is eligible for the content distribution campaign when the plurality of rules is satisfied.

Aspect 110. The method of aspect 109, wherein specifying the third rule corresponding to the course of travel associated with the consumer comprises specifying a destination as the second location.

Aspect 111. The method of aspect 109, further comprising providing a first aspect of the media content associated with the content distribution campaign when the following delivery rules are satisfied:
  the first rule corresponding to the period of time, and
  the second rule corresponding to the at least one element of profile data associated with the consumer.

Aspect 112. The method of aspect 111, further comprising tracking the consumer during the course of travel.

Aspect 113. The method of aspect 111, further comprising providing a second aspect of the media content associated with the content distribution campaign when the third rule associated with the second location is satisfied.

Aspect 114. The method of aspect 111, further comprising, receiving a third indication that the consumer has interacted with the first aspect of the media content during the course of travel.

Aspect 115. The method of aspect 114, wherein specifying the first rule comprises specifying a limited timeframe, during the course of travel, in which the consumer has to interact with the first aspect of the media content.

Aspect 116. The method of aspect 114, further comprising tracking the consumer during the course of travel in response to the third indication.

Aspect 117. The method of aspect 116, wherein tracking the consumer during the course of travel comprises receiving, from a mobile computing device associated with the consumer, at least one of the following:
  location data,
  sensor data,
  telemetry data,
  device usage data, and
  a unique identifier.

Aspect 118. The method of aspect 115, further comprising providing a second aspect of the media content associated with the content distribution campaign when the third rule associated with the second location is satisfied.

Aspect 119. The method of aspect 109, wherein specifying the first rule comprises specifying a limited timeframe, during the course of travel, in which the consumer is eligible to receive the media content associated with the content distribution campaign.

Aspect 120. The method of aspect 111, wherein specifying the first rule comprises specifying a limited timeframe, during the course of travel, in which the consumer is eligible to receive a second aspect of the media content associated with the content distribution campaign.

Aspect 121. A method comprising:
specifying a content distribution campaign comprising media content associated with a geolocation;
specifying a plurality of rules for the content distribution campaign, wherein
specifying the plurality of rules comprises:
 specifying the geolocation,
 specifying a period of time, and
 specifying at least one action to be performed by a consumer;
receiving a first indication that the consumer is within a radius of the geolocation;
tracking the consumer in response to receiving the first indication to determine whether the consumer has performed the at least one action; and
establishing that the consumer is eligible for the content distribution campaign when the plurality of rules is satisfied.

Aspect 122. The method of aspect 121, wherein specifying the at least one action comprises specifying at least one of the following:
a target destination; and
a particular path towards the target destination.

Aspect 123. The method of aspect 121, further comprising:
receiving a second indication that the consumer is engaged in a potential fulfillment of the at least one action.

Aspect 124. The method of aspect 123, wherein receiving the second indication comprises establishing that the consumer is performing at least one of the following actions: moving at a particular path, towards a target destination, and within the period of time.

Aspect 125. The method of aspect 123, further comprising:
providing a first aspect of the media content in response to the first indication.

Aspect 126. The method of aspect 125, further comprising providing, upon a fulfillment of the at least one action, a second aspect of the media content.

Aspect 127. The method of aspect 126, wherein the second aspect of the media content comprises a modification of the first aspect of the media content.

Aspect 128. A method, comprising:
defining at least one of the following for a registered asset:
 a physical asset, and
 a virtual asset;
defining a media content associated with the registered asset, the media content comprising a first message and a second message;
defining a consumer audience segment to be delivered the media content;
defining a set of rules for providing the media content to the consumer audience segment, the set of rules comprising:
 a first rule corresponding a consumer's location in association with the registered asset, and
 a second rule corresponding to at least one action performed by a consumer during a course of travel related to the consumer's location in association with the registered asset;
receiving a first determination that the first rule has been satisfied;
associating the first message with the consumer upon the first rule being satisfied;
receiving a second determination that the second rule has been satisfied; and
associating the second message with the consumer upon the second rule being satisfied.

Aspect 129. The method of aspect 128, wherein defining the set of rules further comprises defining at least one additional rule specifying the following:
the consumer's relative presence at a first location associated a delivery of the first message;
the consumer's relative presence at a second location associated with a delivery of the second message;
the consumer's path from the first location to the second location; and a period of time in which the consumer traveled from the first location to the second location.

Aspect 130. The method of aspect 129, further comprising providing the media content to the consumer.

Aspect 131. The method of aspect 130, wherein providing the media content comprises:
providing the first message when the at least one additional rule has not been satisfied, and
providing the second message when the at least one additional rule has been satisfied.

The following is claimed:

1. A computer-readable medium comprising a set of instructions which when executed perform a method, the method comprising:
registering a brand asset user account;
specifying a brand asset associated with the brand asset user account, wherein specifying the brand asset comprises specifying at least one of the following:
 a trade name,
 a trade dress,
 a logo, and
 a source-identifier associated with a brand;
specifying interactive content to be associated with the brand asset,
 wherein the interactive content is configured to be operative with a content interaction layer on a device configured to receive the interactive content,
  wherein the content interaction layer is configured to enable an interaction between a user of the device and the interactive content;
specifying at least one condition for transmitting the interactive content, wherein specifying the at least one condition comprises specifying at least one action performed by the device;
receiving a captured content from the device;
detecting the brand asset within the captured content;
determining whether the at least one condition for transmitting the interactive content has been met; and
transmitting the interactive content.

2. The computer-readable medium of claim 1, wherein determining whether the at least one condition is met comprises retrieving a device location.

3. The computer-readable medium of claim 2, wherein determining whether the at least one condition is met further comprises comparing the device location to a first geolocation.

4. The computer-readable medium of claim 3, determining whether the at least one condition is met further comprises:
tracking the device location; and
comparing the device location to a second geolocation.

5. The computer-readable medium of claim 1, wherein determining whether the at least one condition is met comprises receiving an indication that the device has performed the at least one action.

6. The computer-readable medium of claim 5, wherein receiving the indication that the device has performed the at least one action comprises determining that the user has interacted with the interactive content.

7. The computer-readable medium of claim 5, further comprising, in response to receiving the indication that the device has performed the at least one action, determining that a conversion metric has been met.

8. The computer-readable medium of claim 5, wherein receiving the indication that the device has performed the at least one action comprises communicating with a device tracking layer operated on the device.

9. The computer-readable medium of claim 8, wherein receiving the indication that the device has performed the at least one action comprises employing the device tracking layer to track at least one of the following:
   location data,
   sensor data,
   telemetry data,
   device usage data, and
   a unique identifier.

10. The computer-readable medium of claim 9, further comprising compiling analytics based on the at least one action.

11. The computer-readable medium of claim 1, wherein specifying the at least one condition for transmitting the interactive content further comprises specifying a location.

12. The computer-readable medium of claim 11, wherein transmitting the interactive content comprises engaging a transmission module configured to transmit the interactive content when the device is within a proximity to a specified location.

13. The computer-readable medium of claim 1, wherein specifying the at least one condition for transmitting the interactive content further comprises specifying a period of time.

14. The computer-readable medium of claim 13, wherein determining whether the at least one condition has been met at least one of the following determining that the captured content was received within the period of time.

15. The computer-readable medium of claim 1, wherein specifying the at least one action performed by the device comprises specifying interactivity criteria.

16. The computer-readable medium of claim 15, wherein specifying the interactivity criteria comprises specifying:
   a change in a physical location associated with the device,
   a particular destination at which the device must arrive, and
   a particular time period in which the device must indicate a fulfillment of the interactivity criteria.

17. The computer-readable medium of claim 16, wherein determining whether the at least one condition is met comprises receiving an indication that the device is moving at a particular path, towards the particular destination and within the particular time period.

18. The computer-readable medium of claim 15, wherein determining whether the at least one condition is met comprises tracking a device location relative to the interactivity criteria.

19. The computer-readable medium of claim 1, further comprising wherein determining whether the at least one condition is met comprises tracking, via a device tracking layer, telemetry data.

20. The computer-readable medium of claim 15, further comprising updating the interactive content upon a fulfillment of the interactivity criteria.

21. The computer-readable medium of claim 1, further comprising updating the interactive content at the device in response to the device having performed the at least one action.

22. The computer-readable medium of claim 1, wherein detecting the brand asset with the captured content comprises processing the captured content to detect an image within the captured content.

23. The computer-readable medium of claim 1, wherein specifying the interactive content comprises receiving the interactive content configured to be displayed as augmented reality content.

24. The computer-readable medium of claim 1, wherein specifying the interactive content comprises receiving the interactive content configured to be overlaid on the captured content from the device.

25. The computer-readable medium of claim 1, wherein specifying the interactive content comprises specifying a uniform resource locator (URL) at which the interactive content can be provided.

26. The computer-readable medium of claim 25, wherein transmitting the interactive content comprises transmitting the URL.

27. The computer-readable medium of claim 1, further comprising associating a digitized image code with the brand asset.

28. The computer-readable medium of claim 27, wherein detecting the brand asset within the captured content comprises detecting the digitized image code.

29. A method comprising:
   registering a brand asset user account;
   specifying a brand asset associated with the brand asset user account;
   specifying interactive content to be associated with the brand asset,
      wherein the interactive content is configured to be operative with a content interaction layer on a device configured to receive the interactive content,
         wherein the content interaction layer is configured to enable an interaction between a user of the device and the interactive content;
   specifying at least one condition for transmitting the interactive content, wherein specifying the at least one condition comprises specifying:
      at least one action performed by the device, and
      at least one geolocation associated with the at least one action;
   receiving a captured content from the device;
   detecting the brand asset within the captured content;
   determining whether the at least one condition for transmitting the interactive content has been met; and
   transmitting the interactive content.

30. A system comprising:
   a memory storage; and
   a processing unit coupled to the memory storage, wherein the processing unit is configured to:
      registering a brand asset user account;
      specify a brand asset associated with the brand asset user account;
      specify interactive content to be associated with the brand asset, wherein the interactive content is configured to be operative with a content interaction layer on a device configured to receive the interactive content,
    wherein the content interaction layer is configured to enable an interaction between a user of the device and the interactive content;
specify at least one condition for transmitting the interactive content, the at least one condition corresponding to:
    at least one profile,
    at least one action performed by the device, and
    at least one geolocation associated with the at least one action;
receive a captured content from the device;
detect the brand asset within the captured content;
determine whether the at least one condition for transmitting the interactive content has been met; and
transmit the interactive content.

* * * * *